United States Patent [19]
Yoshida

[11] Patent Number: 5,440,757
[45] Date of Patent: Aug. 8, 1995

[54] DATA PROCESSOR HAVING MULTISTAGE STORE BUFFER FOR PROCESSING EXCEPTIONS

[75] Inventor: Toyohiko Yoshida, Itami, Japan

[73] Assignee: Mitsubishi Denki Kabushiki Kaisha, Tokyo, Japan

[21] Appl. No.: 200,904

[22] Filed: Feb. 23, 1994

Related U.S. Application Data

[63] Continuation of Ser. No. 612,952, Nov. 13, 1990, abandoned.

[30] Foreign Application Priority Data

Nov. 16, 1989 [JP] Japan .................. 1-299394

[51] Int. Cl.[6] .............................. G06F 9/38
[52] U.S. Cl. ................... 395/800; 395/375; 364/231.8; 364/230.2; 364/261.6; 364/DIG. 1
[58] Field of Search ............... 395/375, 250, 275, 425, 395/800

[56] References Cited

U.S. PATENT DOCUMENTS

| | | | |
|---|---|---|---|
| 4,985,825 | 1/1991 | Webb, Jr. et al. | 395/425 |
| 5,008,812 | 4/1991 | Bhandarkar et al. | 395/375 |
| 5,095,426 | 3/1992 | Senta | 395/375 |
| 5,119,483 | 6/1992 | Madden et al. | 395/375 |
| 5,142,635 | 8/1992 | Saini | 395/375 |
| 5,148,529 | 9/1992 | Ueda et al. | 395/375 |
| 5,155,816 | 10/1992 | Kohn | 395/375 |

*Primary Examiner*—Alyssa H. Bowler
*Assistant Examiner*—Alpesh M. Shah
*Attorney, Agent, or Firm*—Townsend and Townsend Khourie & Crew

[57] ABSTRACT

A data processor having multistage store buffer and constructed such that, when an exception occurs at the time point where unprocessed data is present in the store buffer, the exception processing is performed by saving in a predetermined area of a memory an unprocessed data in the store buffer, an instruction address related thereto, an instruction address in the execution completion step in the execution stage, an storing destination address and information necessary for performing the storing processing, and returning to the instruction sequence starting the exception after writing the unprocessed data to the storing destination address according to these information or checking recursively whether the unprocessed data is saved.

16 Claims, 22 Drawing Sheets

(SERIAL BIT NUMBER)

0    7 8    15 16    23 24    31

(BIT NUMBER IN EACH BYTE)

0    7 0    7 0    7 0    7

N   N+1   N+2   N+3
└─404  └─406

(ADDRESS)                                        ╭402
←LOW ADDRESS                    HIGH ADDRESS→
←MSB SIDE                            LSB SIDE→

→→DIRECTION OF READ INSTRUCTION→→

Fig. 25

| BAT | ADDRESS PIN | DATA PIN H | DATA PIN L | INSTRUCTION PIN |
|---|---|---|---|---|
| 000 | DATA ADDRESS | DATA H | DATA L | UNDEFINED |
| 001 | INSTRUCTION ADDRESS | UNDEFINED | UNDEFINED | INSTRUCTION CODE |
| 100 | COMMAND | OPERAND H | OPERAND L | UNDEFINED |
| 101 | COMMAND | UNDEFINED | PC | UNDEFINED |
| OTHERS | UNDEFINED | UNDEFINED | UNDEFINED | UNDEFINED |

Fig. 28

| Vector | NAME OF EIT | Type | Format |
|---|---|---|---|
| 1 | DEBUG INTERRUPT | 3 | 3 |
| 16 | SELF DEBUG TRAP | 2 | 2 |
| 17 | BUS ACCESS EXCEPTION | 1 | 5 |
| 18 | ADDRESS TRANSLATION EXCEPTION | 1 | 5 |
| 19 | MISSING PAGE EXCEPTION | 1 | 5 |
| 20 | RESERVED INSTRUCTION EXCEPTION | 4 | 0 |
| 25 | ODD ADDRESS JUMP TRAP | 1 | 2 |
| 26 | ZERO DIVIDE TRAP | 1 | 2 |
| 29 | FLOATING-POINT OPERATION TRAP | 3 | 4 |
| 31 | CONDITIONAL TRAP | 1 | 2 |
| 32 | UNCONDITIONAL TRAP | 1 | 2 |
| 64 | EXTERNAL INTERRUPT | 3 | 0 |

S8 GENERATE IOINF RELATING TO INSTRUCTION A FROM INPUT INFORMATION OF INSTRUCTION A, AND SAVE LOGICAL ADDRESS OF THIS IOINF AND INSTRUCTION A, A SET OF LOGICAL ADDRESS AND STORE DATA OF STORING DESTINATION IN STACK. AT THIS TIME, VALUE OF CON(24) OF IOINF RELATING TO INSTRUCTION A BECOME "1".

↓

S9 SAVE LOGICAL ADDRESS OF INSTRUCTION D AS EXPC(13) IN STACK.

↓

S10 SAVE LOGICAL ADDRESS OF INSTRUCTION E AS NEXTPC(12) IN STACK.

↓

S11 SAVE EIT VECTOR NUMBER 17, EIT TYPE NUMBER 1 AND STRCK FORMAT NUMBER 5 OF BUS ACCSSS EXCEPTION AS EITINF IN STACK.

↓

S12 READ PSW VALUE AT THE TIME POINT OF GENERATION OF EIT FROM WORKING REGISTER, AND SAVE IT IN STACK.

↓

S13 READ START ADDRESS OF EIT PROCESSING HANDLER FROM WORKING REGISTER, AND JUMP TO INSTRUCTION OF THIS ADDRESS.

↓

( END )

DATA PROCESSOR HAVING MULTISTAGE STORE BUFFER FOR PROCESSING EXCEPTIONS

This is a Continuation Ser. No. 07/612,952, filed Nov. 13, 1990, now abandoned.

BACKGROUND OF THE INVENTION

1. Field of the Invention

This invention relates to a data processor having a store buffer, more specifically, it relates to a data processor in which, even when instruction being processed by the multistage store buffer generates an exception, the exception can be processed easily.

2. Description of Related Art

In recent years, the performance of the data processor has been improved due to various improvements such as a higher operating frequency or introduction of the pipeline processing and so on.

As an exemplary data processor whose performance has been improved by introduction of the pipeline processing, it is described particularly in U.S. Pat. No. 4,402,042.

However, even when decoding and execution speed of the instructions are improved by the pipeline processing, since the processing speed of the data processor as a whole is limited by the access speed for a memory, in case the access speed for the memory is low, the improvement of the performance of the data processor is limited.

As a method for solving such problem, it is proposed to fill a gap between the access speed of a main memory whole processing speed is relatively low and the processing speed of the data processor, by buffering the instructions and data into a cache memory which is a high speed memory.

As an example of data processor utilizing the aforementioned cache memory, it is described particularly in, for example, Japanese Patent Application Laid-Open No. 63-193230 (1988).

Though the cache memory is effective in reading the instruction and data from the memory, it is problematic in storing the data in the memory. As techniques for storing data when using the cache memory, the following two are proposed.

The first method is the one called a write-back method in which only the content of the cache memory is updated and the content of the main memory is not updated immediately when the cache memory hits at writing the data, and when the content of the cache memory must be replaced, the content rewritten previously in the cache memory is also written back to the main memory.

This method is advantageous in that the data processor can execute high-speed writing of data, but there is a duration between writing the cache memory and the main memory, during which the contents of the two memories do not coincide. Therefore, such a problem is encountered that, controls related to the cache memory become complicated such as the control for preventing the operation of data which are not written back in the main memory, when accessing the main memory by a device other than the data processor which rewrites data into the cache memory, or control for writing back the entry to be replaced to the main memory when the cache memory made a miss. Also, in a video RAM in which the written data must be reflected immediately on a CRT screen, the write-back method can not be used.

The second method is the one called a write-through method in which the content of the main memory is updated immediately irrespective of the hit or miss of the cache memory when writing the data. This method is advantageous in that control of the cache memory is relatively simple and it is compatible with the video RAM. However, since data are always written in the main memory, the data processor can not execute the high-speed data writing.

Accordingly, hitherto, a method for storing the data to be written into the memory temporarily in a store buffer as a FIFO control buffer memory, so as to enable the data processor to move to the next processing before the data are written into the main memory.

As an example of the data processor using the store buffer, it is disclosed particularly in, for example, Japanese Patent Application Laid-Open No. 63-193230 (1988) and No. 1-92840 (1989), and the like.

In the data processor using the store buffer as aforementioned, even when the data storing speed is low, the processing performance of the data processor is not deteriorated.

However, in the conventional data processor, such a problem was encountered that, in the state wherein a plural number of data being processed exist in the store buffer, when a bus error occurs and the exception is detected at the storing operation of data to be stored precedingly, and further, when the instruction being executed then hits a break-point to generate the exception related to the debug, information of sufficient contents to be given to an exception processing handler can not be provided.

For example, in the data processor disclosed in Japanese Patent Application Laid Open No. 1-92840 (1989), only one logical address of the instruction being executed and saved in a stack during the exception processing is prepared. And hence, when the logical address of the instruction which generates the exception at processing of the store buffer is saved in the stack, the logical address of the instruction which generates the exception related to the debug was lost.

Also, unprocessed store data saved in the stack at exception processing and its address are only one, thus the exception occurred in the state wherein a plurality of unprocessed data are held in the store buffer can not be dealt with.

In the invention of Japanese Patent Application Laid-Open No. 63-193230 (1988), though some processing methods associated with the store buffer and the exception processing are disclosed, a reasonable solution related to the processing method of unprocessed store data is not disclosed.

SUMMARY OF THE INVENTION

The present invention has been devised in view of the circumstances aforementioned, therefore, it is an primary object thereof to provide a data processor having multistage store buffer, and in which, when exception is generated by the instruction being processed in the store buffer, the exception can be easily processed by rationalizing the processing at transferring unprocessed store data to an exception processing handler.

In the data processor of the present invention, in order to solve problems encountered in the conventional data processor, in a first invention, it is so constituted that when there is unprocessed data in the store buffer and the exception occurs at the time point where the instruction is completed in the instruction execution stage, the unprocessed data in the store buffer, an address of the instruction related to the data and an address of the instruction executed in the execution stage are saved in a stack. Thereby, when there is unprocessed data in the store buffer and the exception occurs at the time point where the instruction is completed in the instruction execution stage, the unprocessed data in the store buffer, the address of the instruction related to the data and the address of the instruction executed in the execution stage are saved in the stack, and the two instruction addresses are given to the exception processing handler as the arguments.

In a second invention of the data processor of the present invention, when the exception has occurred at the time point where the plural unprocessed data exist in the store buffer, with respect to respective unprocessed data in the store buffer, data to be stored, an storing destination address and an address of the instruction which executed storing processing saved in a stack. Thereby, when the exception has occurred at the time point where there are plural unprocessed data in the store buffer, with respect to respective unprocessed data in the store buffer, the data to be stored, a storing destination address and an address of the instruction which executed storing processing are saved in the stack to transfer the instruction addresses for respective unprocessed data to the exception processing handler as the arguments.

In a third invention of the data processor of the present invention, it is so constituted that, when the exception has occurred at the time point where plural unprocessed data exist in the store buffer, with respect to respective unprocessed data in the store buffer, the data to be stored, a storing destination address and information necessary for storing processing are saved in a stack. Thereby, when the exception has occurred at the time point where plural unprocessed data exist in the store buffer, with respect to respective unprocessed data in the store buffer, the data to be stored, a storing destination address and information necessary for storing processing are saved in the stack to transfer all information necessary for writing and retrying the unprocessed data to the exception processing handler as the arguments.

In a fourth invention of the data processor of the present invention, instructions for write retrying respective unprocessed data in response to the data to be stored, a storing destination address and information necessary for storing with respect to respective plural unprocessed data saved in the stack when the exception has occurred at the time point where plural unprocessed data exist in the store buffer are included. Thereby, the instructions for write retrying respective unprocessed data in response to the data to be stored, a storing destination address and information necessary for storing with respect to respective plural unprocessed data saved in the stack when the exception has occurred at the time point where plural unprocessed data exist in the store buffer, are executed finally by the exception processing handler to return to the instruction sequence which started the exception from the exception processing handler.

In a fifth invention of the data processor of the present invention, when the exception has occurred at the time point where plural unprocessed data exist in the store buffer, with respect to respective unprocessed data in the store buffer, exception processing starting means which saves a series of data including the data to be stored, a storing destination address, information necessary for the storing processing, and further, information indicating whether a set of data related to unprocessed data is present, in a stack in a set, and exception processing means for fetching each data set saved in the stack are included. Thereby, when the exception has occurred at the time point where plural unprocessed data exist in the store buffer, with respect to respective unprocessed data in the store buffer, by repeating recursively the operation to save a series of data including the data to be stored, a storing destination address, information necessary for the storing processing, and further, information indicating whether a data set related to unprocessed data exists, in a stack in a set, all of the unprocessed data are saved in the stack, and a series of data saved in the stack and including the data to be stored in the memory, a storing destination address, information necessary for the storing processing, and further, information indicating whether a data set related to the unprocessed data exists are fetched, and further, by repeating recursively the operation checking the information indicating whether the unprocessed data set exists, the unprocessed data saved in the stack are all fetched and the exception processing is performed.

The above and further objects and features of the invention will more fully be apparent from the following detailed description with accompanying drawings.

BRIEF DESCRIPTION OF THE DRAWINGS

FIG. 25 is a table showing the meaning of BAT(0:2) signal of a data processor of the present invention, FIG. 28 is a schematic view showing the kinds, vector numbers, type number and stack formats of EIT of a data processor of the present invention.

DETAILED DESCRIPTION OF THE PREFERRED EMBODIMENTS

In the following, the present invention will be particularly described with reference to the drawings showing its embodiments.

(1) "Configuration of a System using a Data Processor of the Present Invention"

Figure 1:
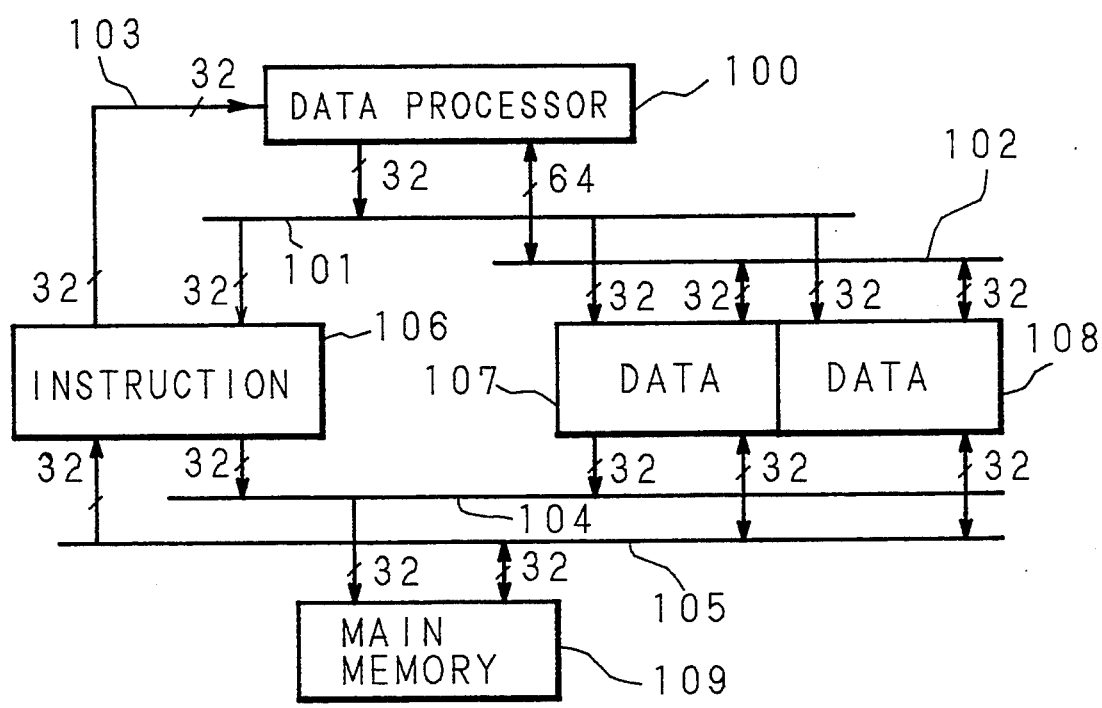
FIG. 1 is a block diagram showing an exemplary configuration of a data processing system using a data processor of the present invention.

FIG. 1 shows a configuration of a system using a data processor of the present invention.

In this configuration, a data processor 100 of the present invention, an instruction cache 106, data caches 107 and 108 and a main memory 109 are connected by an address bus 101, a data bus 102, an instruction bus 103, a memory address bus 104 and a memory data bus 105.

The address bus 101 inputs the address outputted from the data processor 100 of the present invention into the instruction cache 106 and the data caches 107, 108. The instruction bus 103 transfers the instruction code outputted from the instruction cache 106 to the data processor 100 of the present invention. The data bus 102 transfers data outputted from the data processor 100 of the present invention to the data caches 107, 108, or data outputted from the data caches 107, 108 to the data processor 100 of the present invention. The memory address bus 104 transfers the address outputted from the instruction cache 106 or the data caches 107, 108 to the main memory 109. The memory data bus 105 transfers the instruction or data between the main memory 109 and the instruction cache 106 or the data caches 107, 108.

When the instruction cache 106 and the data caches 107, 108 made a miss, the respective cache 106 or 107 arbitrates the bus authority of the memory address bus 104 and the memory data bus 105 to access the main memory 109.

In the data caches 107, 108, on the side of the data processor 100 of the present invention, two chips are operated in cooperation with each other to associate with a 64-bit bus. For each of the 64-bit data, the data cache 107 treats the high-order 32-bit data and the data cache 108 treats the low-order 32-bit data.

In the following, first, an instruction system and a processing mechanism of the data processor 100 of the present invention will be explained, and next, an exception processing method and an operand store operation will be explained in detail.

(2) "Instruction Format of the Data Processor of the Present Invention"

An instruction of a data processor of the present invention is formed on a 16-bit unit basis, being variable in length. No instruction with an odd number of bytes is used herein.

The data processor of the present invention has an instruction format system specifically devised for the purpose of writing highly frequent instructions in a short format. For example, as to a two-operand instruction, two formats are provided; a general format which has basically a configuration of "four bytes+extension part(s)" and allows the utilization of all addressing modes and a short format allowing only the use of a highly frequent instruction and an addressing mode.

The meanings of symbols appearing in the instruction format of the data processor of the present invention shown in FIG. 2 to FIG. 6 are as follows:

-: Field wherein operation code is put.

Ea: Field for generating an operand in a general type 8-bit addressing mode.

Sh: Field for specifying an operand in a short type 6-bit addressing mode.

Rn: Field for specifying an operand in a register by the register number.

Figure 2:
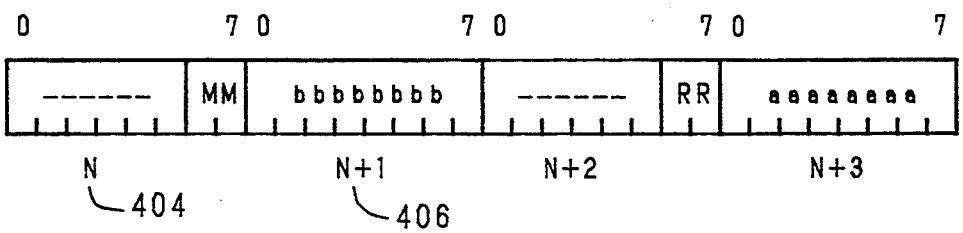
FIG. 2 through FIG. 6 are schematic views showing instruction formats of a data processor of the present invention.

In the format, as shown in FIG. 2, the right side 402 is the LSB side and is high address. The instruction format can be discriminated only after an address N 404 and an address N+1 406 are checked. As described above, this is because of a premise that the instruction is fetched and decoded on a 16-bit (half word) unit basis without fail.

In the data processor of the present invention, in the case with any format, the extension part of Ea or Sh of each operand is sure to be positioned immediately after 16 bits (half word) comprising the basic part of that Ea or Sh. This takes precedence over the immediate data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained addressing mode, this part takes precedence over the next operation field.

For example, consideration is made on the case of 6-byte instruction which comprises Ea1 in a first half word, Ea2 in a second half word, and ends with a third half word. In the case where the chained addressing mode is used for Ea1, and Ea2 has extension part, the actual instruction bit pattern is composed in the sequence of the first half word of instruction (including the basic part of Ea1), the chained addressing mode of Ea1, the second half word of instruction (including the basic part of Ea2), the extension part of Ea2 and the third half word of instruction.

(2.1) "Short-Format Two-Operand Instruction"

Figure 3:
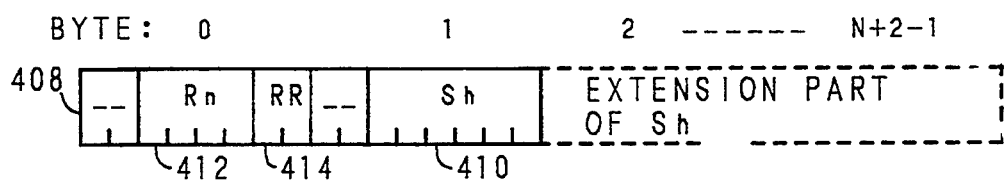

FIG. 3 is a schematic diagram showing short format of the two-operand instruction.

This format includes a L-format wherein the source operand side is a memory and a S-format wherein the destination operand side is a memory.

In the L-format, symbol Sh 410 represents the specifying field of the source operand, symbol Rn 412 represents the specifying field of the register of the destination operand and RR 414 represents specifying of the operand size of Sh 410, respectively. The size of the destination operand located in the register is fixed to 32 bits. Where the size of the resister side differs from that of the memory side and the size of the source side is smaller, sign extension is performed.

In the S-format, symbol Sh 410 represents the specifying field of the destination operand, symbol Rn 412 represents the register specifying field of the source operand and RR 414 represents specifying of the operand size of Sh 410, respectively. The size of the source operand located in the register is fixed to 32 bits. Where the size of the register side differs from that of the memory side and the size of the source side is larger, truncating of the over-flow portion and overflow check are performed.

(2.2) "General-Format One-Operand Instruction"

Figure 4:
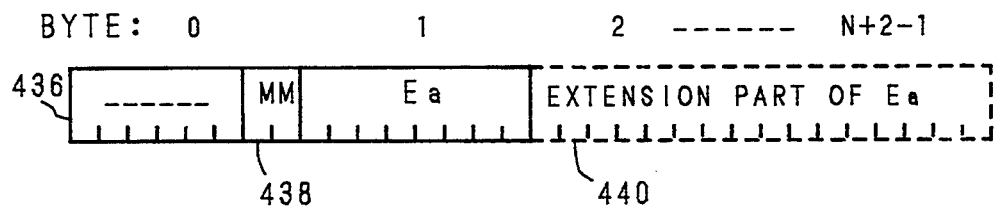

FIG. 4 is a schematic diagram showing a general format 436 of one-operand instruction (G1-format).

Symbol MM 438 represents the specifying field of the operand size. Some of the G1-format instructions comprise an extension part besides the extension part of Ea 440. There are also instructions using no MM 438.

(2.3) "General-Format Two-Operand Instruction"

Figure 5:
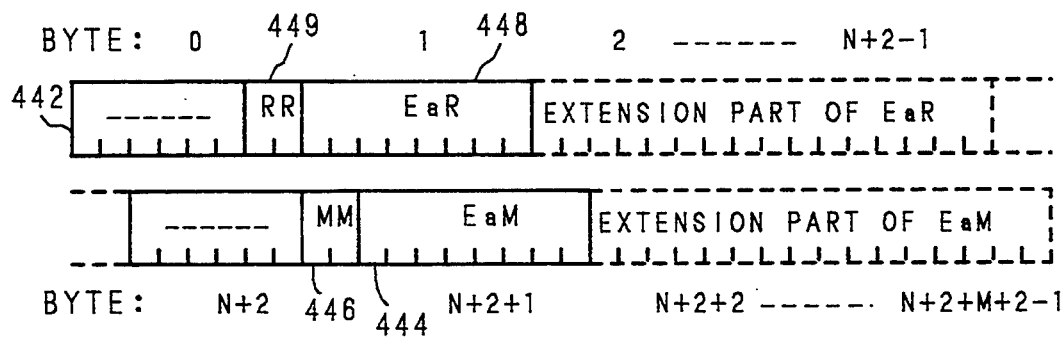

FIG. 5 is a schematic diagram showing general format of two-operand instruction.

This format comprises an instruction having a maximum of two operands of the general-type addressing mode which are specified by eight bits. There are cases where the total number of operands becomes three or more.

Symbol EaM 444 represents the specifying field of the destination operand, symbol MM 446 represents the specifying field of the destination operand size, EaR 448 represents the specifying field of the source operand, and RR 449 represents the specifying field of the source operand size.

Some of the G-format instructions comprise an extension part besides the extension part of EaM 444 and EaR 448.

Figure 6:
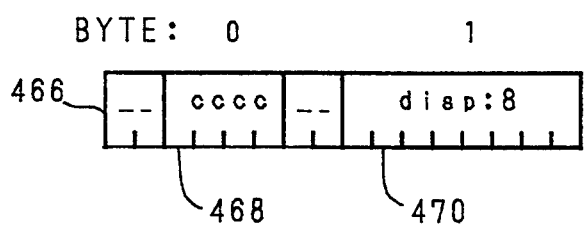

FIG. 6 is a schematic diagram showing a format 466 of a short branch instruction.

Symbol cccc 468 represents the specifying field of a branch condition, symbol disp: 8 470 represents the specifying field of displacement to a jump destination, and in the data processor of the present invention, when displacement is specified by eight bits, the displacement value is set by doubling the specified value in the bit pattern.

(2.4) "Addressing Mode"

The methods of specifying the addressing mode of the data processor of the present invention include the short type specified by six bits including the register and the general type specified by eight bits.

Where an undefined addressing mode has been specified, or where a combination of addressing modes obviously unsuitable has been specified, a reserved instruction exception is generated, likewise, the case where the undefined instruction has been executed, and exception processing is started.

Examples of these cases are the case where the destination is the immediate mode and the case where the immediate mode is used in the specifying field of the addressing mode to be accompanied by address calculation.

Meanings of symbols used in the format diagram shown in FIG. 7 to FIG. 10 is as follows:

Rn: Register specifying (Sh): Designating method by the short-type addressing mode of six bits (Ea): Designating method by the general-type addressing mode of eight bits In the format diagram, the portion surrounded by a broken line shows the extension part.

(2.4.1) "Basic Addressing Modes"

The data processor of the present invention supports various addressing modes. Among them, the basic addressing modes supported by the data processor of the present invention include a register direct mode, a register indirect mode, a register relative indirect mode, an immediate mode, an absolute mode, a Program Counter (PC) relative indirect mode, a stack pop mode and a stack push mode.

Figure 7:
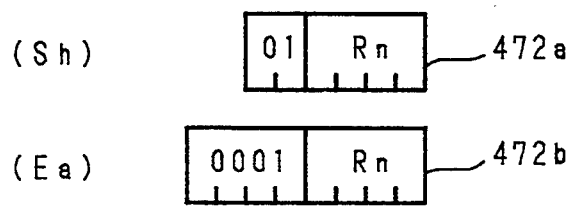
FIG. 7 through FIG. 20 are schematic views showing formats of an addressing mode specifying field in the instruction of the present invention.

The register direct mode takes the content of register intact as an operand. FIG. 7 is a schematic diagram of the format thereof. Each symbol Rn 472a, 472b shows the number of the general-purpose register.

Figure 8:
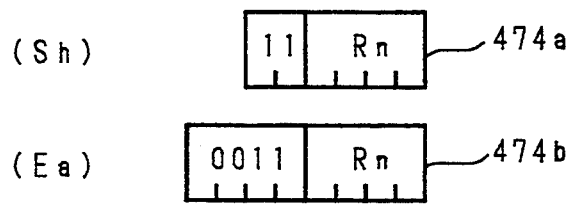

The register indirect mode takes as an operand the content of the memory whose address is the content of a register. FIG. 8 is a schematic diagram of the format thereof. Each symbol Rn 474a, 474b shows the number of the general-purpose register.

Figure 9:
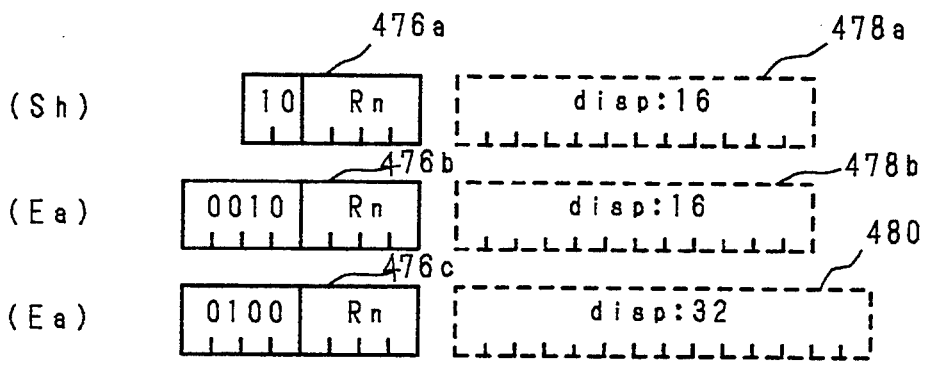

The register relative indirect mode includes two kinds (16 bits and 32 bits) of the displacement value. Each of them takes as an operand the content of the memory whose address is the value of the content of the register added to the displacement value of 16 bits or 32 bits. FIG. 9 is a schematic diagram of the format thereof. Each symbol Rn 476a, 476b, 476c shows the number of the general-purpose register. Each symbol disp: 16 478a, 478b and disp: 32 480 shows the displacement value of 16 bits and the displacement value of 32 bits, respectively. The displacement value is handled with a signed binary number.

Figure 10:
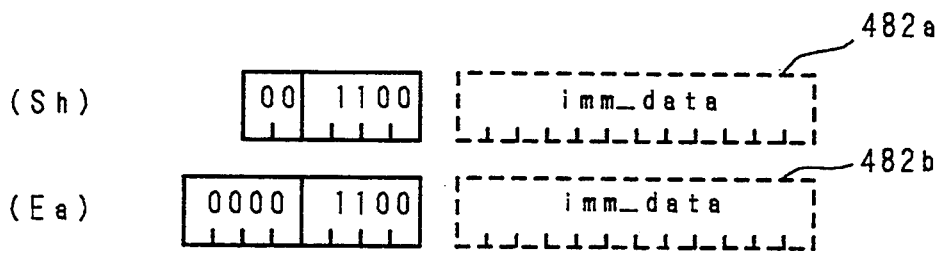

The immediate mode takes as an operand the bit pattern specified in the instruction code while assuming it intact as a binary number. FIG. 10 is a schematic diagram of the format thereof. Each symbol imm_data 482a, 482b shows the immediate. The size of imm_data is specified in the instruction as the operand size.

Figure 11:
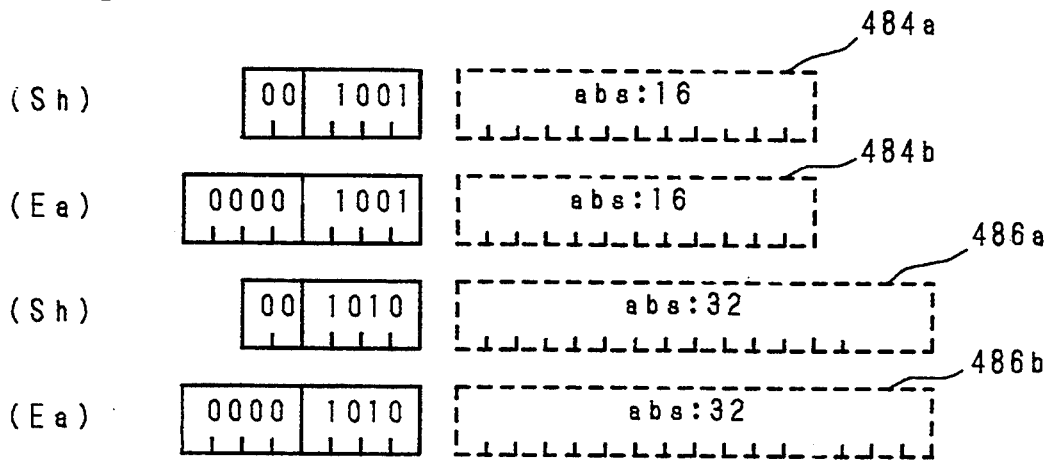

The absolute mode includes two kinds of field (16 bits and 32 bits) for showing the address value. Each kind takes as an operand the content of the memory whose address is the bit pattern of 16 bits or 32 bits specified in the instruction code. FIG. 11 is a schematic diagram showing the format thereof. Each symbol abs: 16 484a, 484b and abs: 32 486a shows the address value of 16 bits and 32 bits, respectively. When the address is shown by abs: 16, the specified address value is sign-extended to 32 bits.

Figure 12:
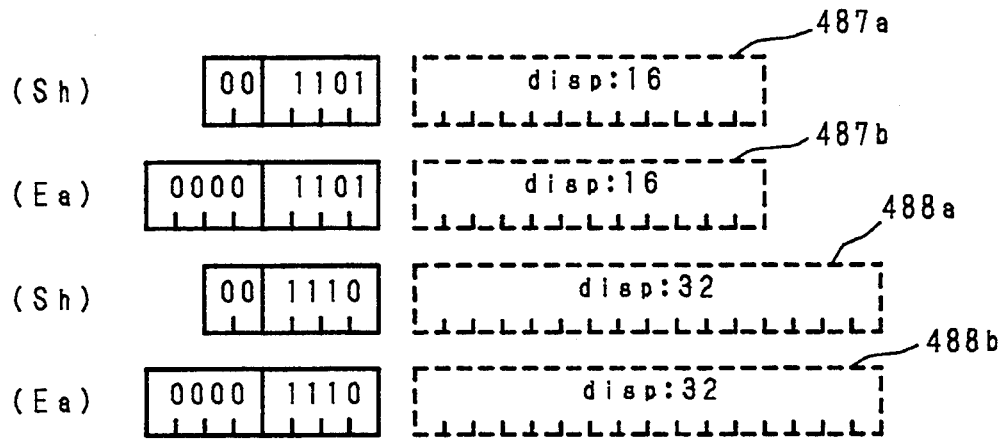

The PC relative indirect mode includes two kinds of field (16 bits and 32) for bits of the displacement value. Each takes as an operand the content of the memory whose address is the value of the content of a program counter whereto the displacement value of 16 bits or 32 bits is added. FIG. 12 is a schematic diagram showing the format thereof. Each symbol disp: 16 486a, 486b and disp: 32 488a, 488b shows the displacement value of 16 bits and the displacement value of 32 bits, respectively. The displacement value is handled with a signed binary number. In the PC relative indirect mode, the value of the program counter to be referred is the start address of the instruction comprising the operand. Where the value of the program counter is referred in the chained addressing mode, the start address of the instruction is also used as a reference value of PC relativity.

Figure 13:
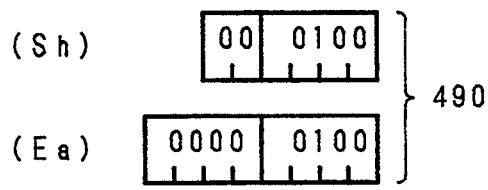

The stack pop mode takes as an operand the content of the memory whose address is the content of a stack pointer (SP). After operand access, the SP is incremented by the operand size. For example, where 32-bit data is handled, the SP is renewed (incremented) by +4 after the operand access. Designating of the stack pop mode for operands of sizes of 8 bits, 16 bits and 64 bits can also be performed, and the SP is renewed (incremented) by +1, +2 and +8, respectively. FIG. 13 is a schematic diagram of the format thereof. As to the one wherein the stack pop mode is invalid for the operand, a reserved instruction exception is generated. Specifically, the stack pop mode specifying for a write operand and a read-modify-write operand becomes the reserved instruction exception.

Figure 14:
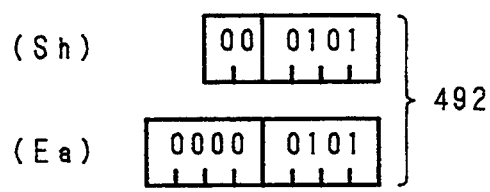

The stack push mode takes as an operand the content of the memory whose address is the content of the SP decremented by the operand size. In the stack push mode, the SP is decremented before operand access. For example, when handling 32-bit data, the SP is renewed (decremented) by −4 before operand access. It is also possible to specify the stack push mode for operands of sizes of 8 bits, 16 bits and 64 bits, and the SP is renewed (decremented) by −1, −2 and −8, respectively. FIG. 14 is a schematic diagram showing the format thereof. As to the one wherein the stack push mode is invalid for the operand, a reserved instruction exception is generated. Specifically, the stack push mode specifying a read operand and a read-modify-write operand becomes the reserved instruction exceptions.

(2.4.2) "Chained Addressing Mode"

Addressing, whatever complicated, can basically be decomposed into combinations of addition and indirect reference. Accordingly, operations of addition and indirect reference are given in advance as primitives of addressing, and in the case where they can be combined arbitrarily, any complicated addressing mode can be realized. The chained addressing mode of the data processor of the present invention is an addressing mode based on such a conception. A complicated addressing mode is particularly useful for data reference between modules or the processing system of AI (Artificial Intelligence) language.

When specifying the chained addressing mode, in the basic addressing mode specifying field, one is specified from among three kinds of specifying methods viz. a register base chained addressing mode, a PC base chained addressing mode and an absolute chained addressing mode.

Figure 15:
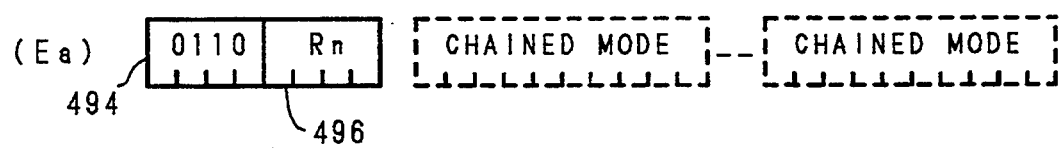

The register base chained addressing mode is an addressing mode taking the value of register as the base value of the chained addressing to be extended. FIG. 15 is a schematic diagram showing the format 494 thereof. Symbol Rn 496 shows the number of the general-purpose register.

Figure 16:

The PC base chained addressing mode is an addressing mode taking the value of the program counter (PC) as the base value of the chained addressing to be extended. FIG. 16 is a schematic diagram showing the format 498 thereof.

Figure 17:

The absolute base chained addressing mode is an addressing mode taking zero as the base value of the chained addressing to be extended. FIG. 17 is a schematic diagram of the format 500 thereof.

Figure 18:
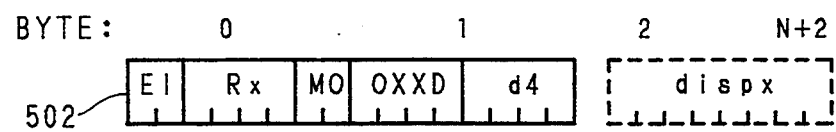

The chained addressing mode specifying field to be extended takes 16 bits as a unit, and this is repeated number of times. In each stage of the chained addressing mode, addition of displacement, scaling (×1, ×2, ×4, ×8) and addition of an index register, and indirect reference of memory are performed. FIG. 18 is a schematic diagram showing the format 502 of the chained addressing mode. Each field has meanings as shown below.

| | |
|---|---|
| E=0: | Chained addressing mode is continued. |
| E=1: | Address calculation ends.<br>tmp ==> address of operand |
| I=0: | No memory indirect reference is performed.<br>tmp + disp + Rx * Scale ==> tmp |
| I=1: | Memory indirect reference is performed. |

| | |
|---|---|
| | mem [tmp + disp + Rx * Scale] ==> tmp |
| M=0: | \<Rx\> is used as an index. |
| M=1: | Special index<br>\<Rx\> = 0 Index value is not added (Rx = 0).<br>\<Rx\> = 1 Program counter is used as an index value (Rx = PC).<br>Rx\> = 2 or more   Reserved. |
| D=0: | The value of field d4 of four bits in the chained addressing mode is quadrupled to be taken as a displacement value, and this value is added. The d4 is handled with a signed binary number, and is used by surely quadrupling it irrespective of the size of the operand. |
| D=1: | The dispx (16/32 bits) specified in the extension part of the chained addressing mode is taken as a displacement value, the size of the extension part whereto this value is added is specified in the d4 field.<br>d4 = 0001   dispx: 16 bits<br>d4 = 0010   dispx: 32 bits |
| XX: | Index scale (scale = 1/2/4/8) |

Where scaling of ×2, ×4, ×8 has been performed for the program counter, an indefinite value is entered as an intermediate value (tmp) after completion of processing of that stage. The effective address obtained by this chained addressing mode becomes an unpredictable value, but no exception is generated. Designating of scaling for the program counter should not be performed.

Figure 19:
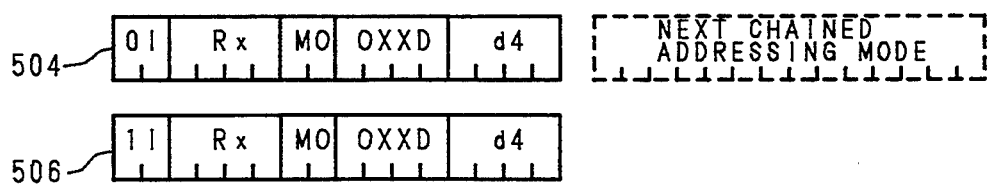
Figure 20:
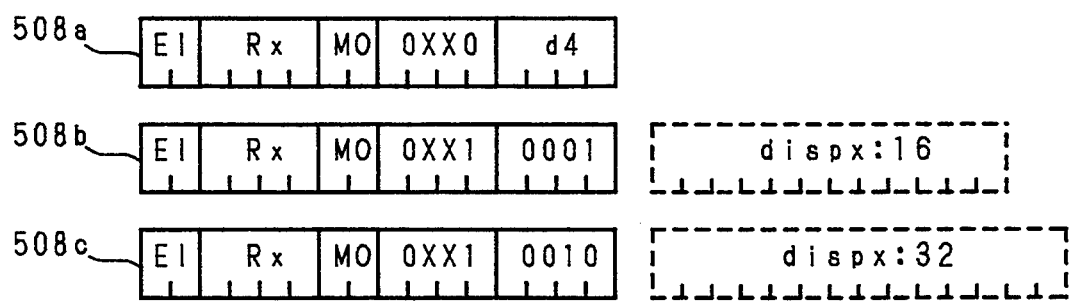

FIGS. 19 and 20 show variations on the instruction format formed by the chained addressing mode.

FIG. 19 shows variations of continuation 504 and completion of the chained addressing mode.

FIG. 20 shows variations 508a, 508b, 508c on the size of displacement.

In the case where the chained addressing mode of an arbitrary number of stages can be utilized, case-sorting in the compiler, based on the number of stage, can be dispensed with, and therefore an advantage of alleviating the burden on the compiler is obtainable. This is because, even if frequency of chained reference is very low, the compiler has to be able to generate a correct code without fail. For this reason, up to an arbitrary number of stages can be applied in the format.

(3) "Configuration of Function Block"

Figure 21:
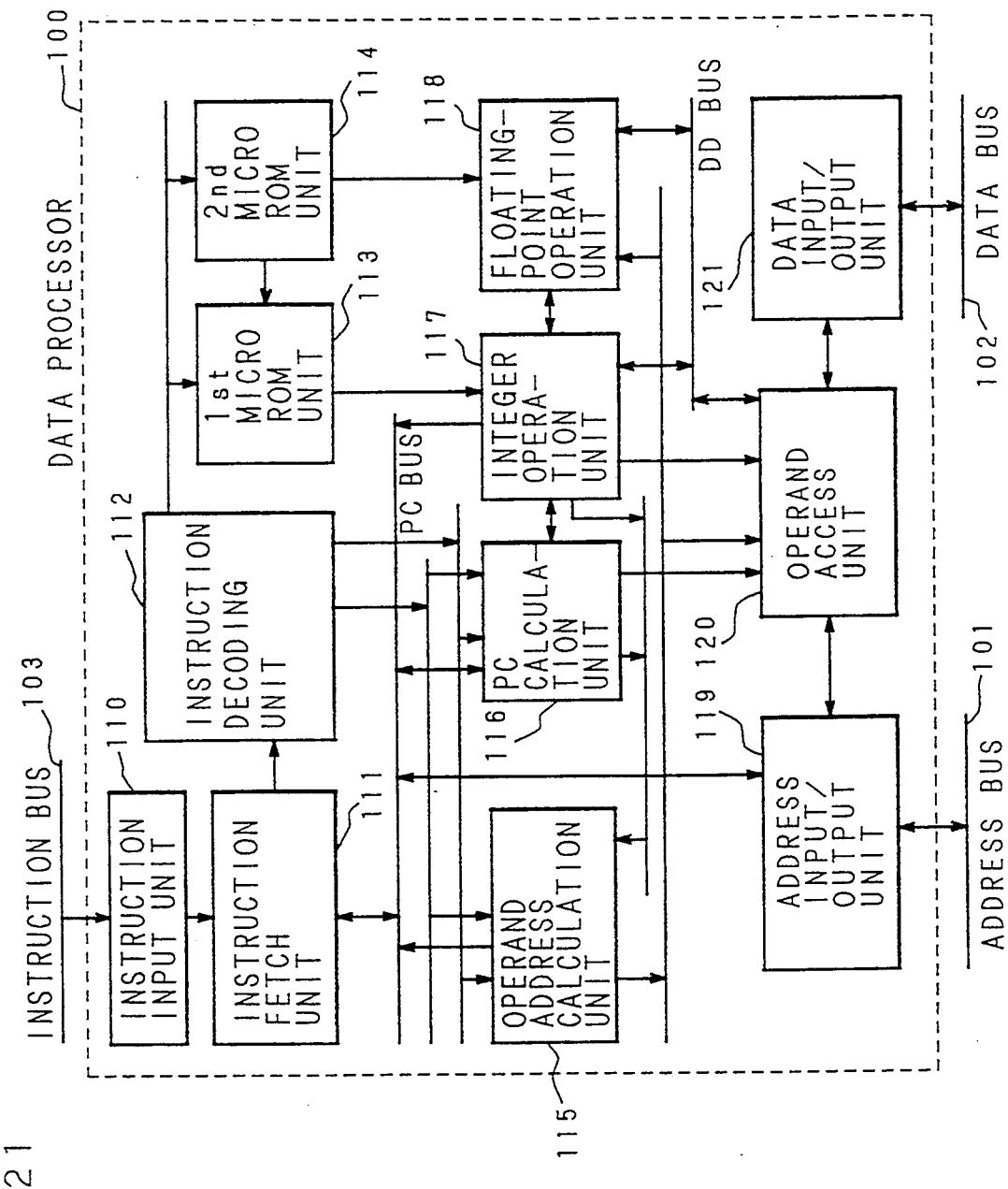
FIG. 21 is a block diagram showing a general configuration of a data processor of the present invention.

FIG. 21 is a block diagram showing a configuration of the data processor of the present invention.

The interior of the data processor of the present invention is functionally divided roughly into an instruction input unit 110, an instruction fetch unit 111, an instruction decoding unit 112, a first micro ROM unit 113, a second micro ROM unit 114, an operand address calculation unit 115, a PC calculation unit 116, an integer operation unit 117, a floating-point operation unit 118, an address input/output unit 119, an operand access unit 120 and a data input/output unit 121.

The system configuration as abovementioned and shown in FIG. 1 can be realized by connecting the address input/output unit 119 to the address bus 101, the data input/output unit 121 to the data bus, and the instruction input unit 110 to the instruction bus 103.

(3.1) "Instruction Input Unit"

The instruction input unit 110 inputs instruction codes by 32 bits to the data processor of the present invention from the external instruction bus 103.

There are two access modes for the instruction cache 106. One is a standard access mode wherein 32 bits instruction code is accessed with respect to one address. Another is a quad access mode wherein 32 bits instruction code is continuously accessed by four times with respect to one address. In both cases, the instruction input unit 110 outputs the inputted instruction code to the instruction fetch unit 111.

(3.2) "Instruction Fetch Unit"

The instruction fetch unit 111 which comprises an address translation mechanism for an instruction address, a built-in instruction cache, a TLB for instruction, an instruction queue and a controlling unit thereof.

The instruction fetch unit 111 translates the logical address of the instruction to be fetched next, fetches the instruction code from the built-in instruction cache, and outputs it to the instruction decoding unit 112. In the case where the built-in instruction cache makes miss, the instruction fetch unit 111 outputs the physical address to the address input/output unit 119 to request an instruction access for exterior, so that the instruction code inputted through the instruction input unit 110 is registered to the built-in cache.

The logical address of an instruction to be fetched next is calculated by a dedicated counter as the logical address of the instruction to be inputted to an instruction queue. In the case where a jump is generated, a logical address of a new instruction is transferred from the operand address calculation unit 115, PC calculation unit 116 or the integer operation unit 117.

A control circuit inside the instruction fetch unit 111 also executes address translation and updating of the TLB for instruction by paging in the case where the TLB for instruction makes miss.

Also, in the case where the data processor of the present invention is under the bus watch mode, an entry, which is hit by the physical address inputted through the address input/output unit 109, of the built-in instruction cache is made invalid.

(3.3) "Instruction Decoding Unit"

In the instruction decoding unit 52, basically an instruction code is decoded on a 16-bit (half word) basis. This block comprises a FHW decoder for decoding an operation code included in the first half word, a NFHW (not first half word) decoder for decoding an operation code including in the second and the third half words, and an addressing mode decoder for decoding an addressing mode.

There are also the second stage decoder which further decodes an output of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 112 decodes the instruction code being inputted from the instruction fetch unit 111 by 0 bytes through 6 bytes per one clock. Among the results of decoding, information on operation in the integer operation unit 117 is outputted to the first micro ROM unit 113, information on operation in the floating-point operation unit 118 is outputted to the second micro ROM unit 114, information on operand address calculation is outputted to the operand address calculation unit 115, and information on PC calculation is outputted to the PC calculation unit 116, respectively.

(3.4) "First Micro ROM Unit"

The first micro ROM unit 113 comprises a micro ROM for storing microprograms which mainly controls the integer operation unit 117, a microsequencer, and a microinstruction decoder.

A microinstruction is read out from the micro ROM once per one clock. The microsequencer accepts processings of exception, interruption and trap (these three are generally called EIT) in addition to the sequential processings of the microprograms corresponding t each EIT, besides the sequential processing for execution of the microprogram relating to instruction execution.

To the first micro ROM unit 113, there are inputted interruption independent of the instruction code and branch condition of the microprogram by the result of integer operation execution.

Output of the microdecoder is mainly given to the integer operation unit 117, but some information is outputted also to other blocks at execution of jump instruction and acceptance of execution.

(3.5) "Second Micro ROM Unit"

In the second micro ROM unit 114, a micro ROM in which various microprogram routines for controlling a floating-point operation unit 118 are stored, a microsequencer, a microinstruction decoder and so on are included.

The microinstruction is read from the micro ROM once in one clock. The microsequencer also processes the exception related to the floating-point operation besides the sequence processing indicated by the microprogram, and when the floating point exception not masked is detected, requests the exception processing to the first micro ROM unit 113. The microsequencer of the second micro ROM unit 114 operates in parallel to the microsequencer of the first micro ROM unit 113, and controls the floating-point operation unit 118 in parallel to an integer operation unit 117.

To the second micro ROM unit 114, flag information resulted from the floating-point operation execution is also inputted.

Though output of the microdecoder is mainly outputted to the floating-point operation unit 118, a part of information such as detection of the exception related to the floating-point operation is also outputted to the other functional blocks.

(3.6) "Operand Address Calculation Unit"

The operand address calculation unit 115 is controlled in a hardwired manner by information on oper- and address calculation outputted from the address decoder of the instruction decoding unit 112 or the like. In this operand address calculation unit 115, operand address calculation other than the memory access for the memory indirect addressing, and jump target address calculation of the jump instruction are executed.

The result of operand address calculation is sent to the integer operation unit 117. In pre-jump processing at the completion of operand address calculation, the result of jump target address calculation is outputted to the instruction fetch unit 111 and the PC calculation unit 116.

An immediate value operand is outputted to the integer operation unit 117 and the floating-point operation unit 118. The values of the general-purpose register and the program counter required for address calculation are inputted from the integer operation unit 117 or the PC calculation unit 116.

(3.7) "PC Calculation Unit"

The PC calculation unit 116 is controlled in a hardwired manner using information on PC calculation outputted from the instruction decoding unit 112. The PC calculation unit 116 calculates the PC value of an instruction.

The data processor of the present invention has a variable-length instruction set, and the length of that instruction can be found only after the instruction is decoded. For this reason, the PC calculation unit 116 generates the PC value of the next instruction by adding the length of the instruction outputted from the instruction decoding unit 112 to the PC value of the instruction in decoding.

The result of calculation in the PC calculation unit 116 is outputted as the PC value of each instruction together with the result of decoding of the instruction.

In pre-branch processing at the instruction decoding stage, an address of branch destination instruction is calculated by adding a branch width outputted from the instruction decoding unit 11 and the PC value.

Also, the PC calculation unit 116 is provided with a PC stack for holding a copy of PC value, which is push to the stack at executing a jump instruction for the subroutine, of return destination from the subroutine. The PC calculation unit 116, for the return instruction from the subroutine, executes processing of generating an address of pre-return destination by reading out the return destination PC value from the PC stack.

(3.8) "Integer Operation Unit"

The integer operation unit 117 is controlled by the microprogram stored in a micro ROM of the first micro ROM unit 113, and executes operations necessary for realizing the function of each integer operation instruction, using the register file and arithmetic unit in the integer operation unit 117.

In the register file, a general register and a working register are included. In the integer operation unit 117, a flag which is varied by the result of integer operation and processor status word (PSW) including the bits which decide the external interruption mask level and the debug environment are included.

When an operand to be calculated by an instruction is an address or an immediate value, the immediate value or calculated address is inputted from the operand address calculation unit 115. Also, when an operand to be calculated by an instruction is data on the memory, the address calculated in the address calculation unit 115 is outputted to the operand access unit 120, and the operand fetched from the internal data cache or the outside is inputted to the integer operation unit 117.

In operation, in the case where the internal data cache, external data caches 107, 108 or the main memory 109 must be read, the integer operation unit 117 outputs the address to the operand access unit 120 and fetches target data by direction of the microprogram.

When it is necessary to store the operation result in the internal data cache, external data caches 107, 108 or the main memory 109, the integer operation unit 117 outputs the address and data to the operand access unit 120 by direction of the microprogram. At this time, from the PC calculation unit 116, the PC value of the instruction executing the storing operation is outputted to the operand access unit 120.

When external interruption and exception are processed and the integer operation unit 117 receives the new instruction address, the integer operation unit 117 outputs the new instruction address to the instruction fetch unit 111 and the PC calculation unit 116.

(3.9) "Floating Point Operation Unit"

The floating-point operation unit 118 is controlled by the microprogram stored in a micro ROM of the second micro ROM unit 114, and executes operations necessary for realizing the function of each floating-point operation instruction, using the register file and operation device in the floating-point operation unit 118.

When an operand to be calculated by an instruction is an immediate value, the immediate value is inputted to the floating-point operation unit 118 from the operand address calculation unit 115. When an operand to be calculated by an instruction is data on the memory, the address calculated in the address calculation unit 115 is outputted to the operand access unit 120, and the operand fetched from the internal data cache or the outside is inputted to the floating-point operation unit 118.

When it is necessary to store the operand in the internal data cache, external data caches 107, 108 or the main memory 109, the floating-point operation unit 118 outputs data to the operand access unit 120 by direction of the microprogram. In storing operation, the floating-point operation unit 118 and the integer operation unit 117 operate in corporation with each other to output the operand address from the integer operation unit 117, and the operand from the floating-point operation unit 118 to the operand access unit 120. At this time, from the PC calculation unit 116, the PC value of the instruction executing the storing operation is outputted to the operand access unit 120.

(3.10) "Operand Access Unit"

The operand access unit 120 comprises an address translating mechanism of the operand address, a built-in data cache, a TLB for data, a store buffer and controllers thereof.

In data loading operation, the operand access unit 120 translates the logical address of data, which is outputted from the operand address calculation unit 115 or the integer operation unit 117 and to be loaded, into the physical address, fetches data from the built-in data cache and outputs to the integer operation unit 117 or the floating-point operation unit 118. When the built-in data cache made a miss, the operand access unit 120 outputs the physical address to the address input/output unit 119, requests external data access and registers the data inputted through a data input/output unit 122 in the built-in data cache.

In data storing operation, the operand access unit 120 translates the logical address of data, which is outputted from the integer operation unit 117 and to be stored, into the physical address, stores the data outputted from the integer operation unit 117 or the floating-point operation unit 118 in the built-in data cache, and at the same time, outputs the physical address to the address input/output unit 119 through the store buffer and the data to the outside through the data input/output unit 122. In the store buffer, data to be stored and its address, and further the address of the instruction executing the storing operation are managed in one set. The storing operation in the store buffer is managed by an FIFO (first-in first-out) control method.

Address translation and updating of TLB for data by paging, in the case where the TLB for data made a miss, are performed by an internal control circuit in the operand access unit 120. Also, whether the memory access address is included in an I/O area mapped in the memory is checked.

In the case where the data processor of the present invention is under a bus watching mode, the operand access unit 120 repeals the entry of built-in data cache hit by the physical address inputted through the address input/output unit 119.

(3.11) "Address Input/Output Unit"

The address input/output unit 119 outputs the address outputted from the instruction fetch unit 111 and the operand access unit 120 to the outside of the data processor 100 of the present invention.

The address is outputted in accordances with a bus protocol defined in the data processor 100 of the present invention.

The bus protocol is controlled by an external bus control circuit in the address input/output unit 119. In the external bus control, the missing page exception, bus access exception and external interruption are also received.

When external device other than the data processor 100 of the present invention is a bus master and the data processor 100 of the present invention is under the bus watching mode, the address input/output unit 119 fetches the address outputted on the address bus 101 when the external device executes the data write cycle, and transfers to the instruction fetch unit 111 and the operand access unit 120.

(3.12) "Data Input/Output Unit"

The data input/output unit 121, at operand loading operation, fetches data from the data bus 102 and transfers it to the operand access unit 120, and at operand storing operation, outputs the operand outputted from the operand access unit 120 to the data bus 102.

As the accessing method of the data caches 107, 108, there are a standard access mode in which 64-bit data are accessed for one address, and a quad accessing mode in which 64-bit data are accessed continuously four times for one address, in either case, the data input/output unit 121 inputs and outputs the data exchanged between the operand access unit 120 and the external memory.

(4) "Pipeline Processing"

The data processor 100 of the present invention performs the pipeline processing of the instruction and operates very efficiently, by effective accessing of the memory using various buffer memories, the instruction bus 103 and the data bus 102.

Here, a pipeline processing method of the data processor 100 of the present invention will be described.

(4.1) "Pipeline Mechanism"

Figure 22:
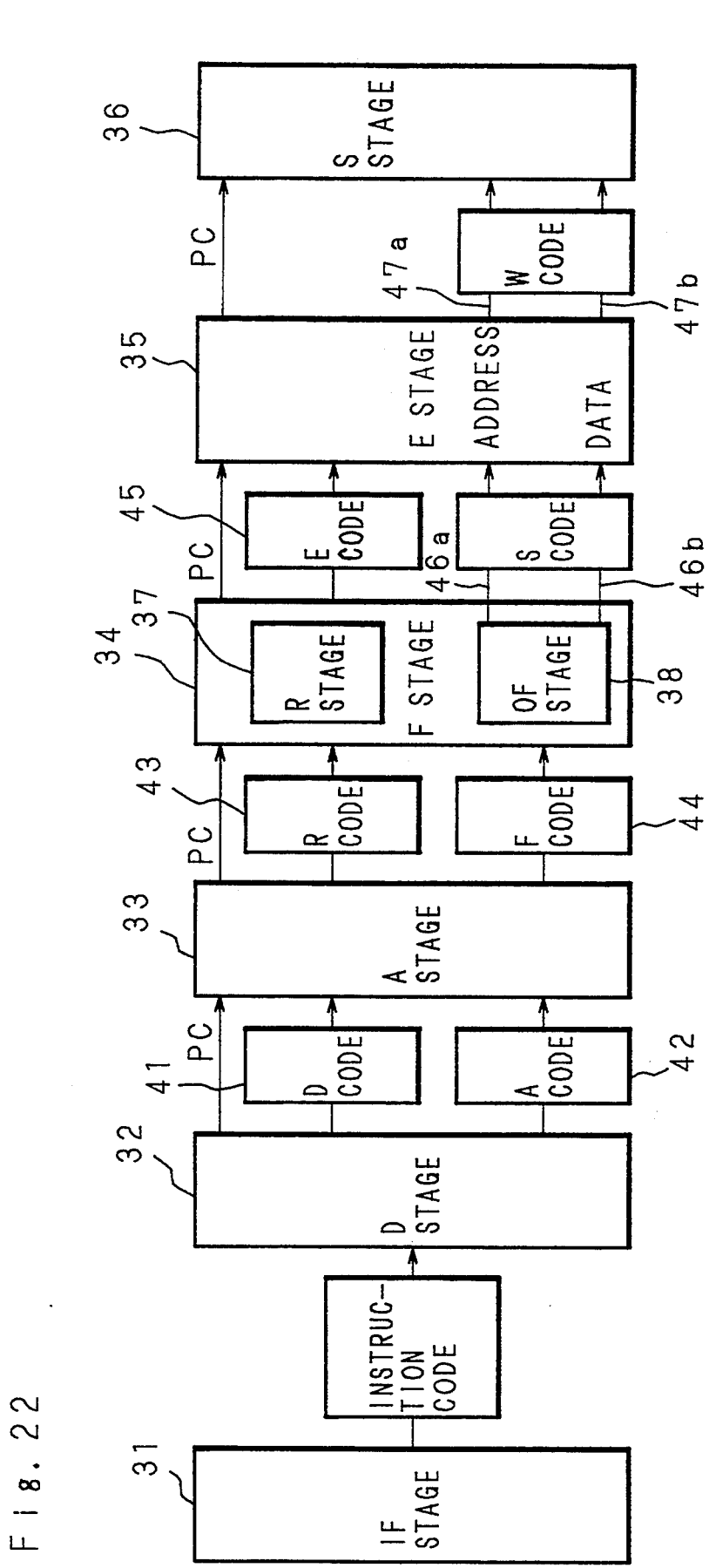
FIG. 22 is a schematic view for explaining a pipeline processing stage of a data processor of the present invention.

A pipeline processing mechanism of the data processor 100 of the present invention is constituted as shown schematically in FIG. 22.

The pipeline processing is executed in six-stage configuration of an instruction fetch stage (IF stage) 31 which prefetches instructions, a decoding stage (D stage) 32 for decoding the instruction, an operand address calculation stage (A stage) 33 which performs address calculation of the operand, an operand fetch stage (F stage) 34 which performs the micro ROM access (particularly referred to as an R stage 37) and the operand prefetch (particularly referred to as an OF stage 38), an execution stage (E stage) 35 for executing the instruction and a store stage (S stage) 36 which stores the memory operand.

In the S stage 36, there are 3-stage store buffer.

Each stage operates independently of the other stages and, theoretically, the six stages operate completely independently.

Each stage other than the S stage 36 performs one processing in one clock at a minimum. The S stage 36 performs one operand storing in two clock at a minimum. Thus, in the case where there is no memory operand storing, theoretically, the pipeline processing is proceeded sequentially in every one clock.

In the data processor of the present invention, though there is the instruction which can not be processed by only one basic pipeline processing such as the memory-memory operation or the memory indirect addressing, it is so constituted that the balanced pipeline processing be also performed for these processings if possible.

For the instruction having a plural number of memory operands, the pipeline processing is performed by decomposing into plural pipeline processing units (step code) in the decoding stage in response to the number of memory operands.

Information given to the D stage 32 from the IF stage 31 is the instruction code itself.

Information given to the A stage 33 from the D stage 32 are, a code (referred to as a D code 41) related to the operation specified by the instruction, a code (referred to as an A code 42) related the operand address calculation and a program counter value (PC) of the instruction being processed.

Information given to the F stage 34 from the A stage 33 are, an R code 43 including the entry address of the microprogram routine and parameters to the microprogram, a F code 44 including the operand address and accessing indicating information, and the program counter (PC) value of the instruction being processed.

Information given to the E stage 35 from the F stage 34 are, an E code 45 including operation control information and literal, S codes (46a, 46b) including the operand and operator address and the PC value of the instruction being processed.

The S codes 46a, 46b comprise an address 46a and data 46b.

Information given to the S stage 36 from the E stage 35 are W codes 47a, 47b which are the operation results to be stored and the PC value of the instruction outputting the operation results.

The W codes 47a, 47b comprise an address 47a and data 47b.

An EIT detected in the stages before the E stage 35 does not start EIT processing until the code thereof reaches the E stage 35. It is because that, only the instruction processed in the E stage 35 is the instruction in the execution step, and the instruction processed in the IF stage 31 through F stage 34 is still not in the execution step. Accordingly, detection of the EIT before the E stage 35 is registered in the step code and just transmitted to the next stage.

The EIT detected in the S stage 36 is received at the time point where execution of the instruction being processed in the E stage 35 is completed or at cancellation of the processing of the instruction, and returned to the E stage 35 for processing.

(4.2) "Processings in Each Pipeline Stage"

The input/output step codes to respective pipeline stages are named, as shown in FIG. 21, for the sake of convenience. In the step codes, there are two kinds, the one which becomes the parameter for the micro ROM entry address and the E stage 35 by performing the processing related to the operation code, and the other which becomes the operand to be processed in the E stage 35.

Between the D stage 32 and the S stage 36, the PC value of the instruction being processed is received and given.

(4.2.1) "Instruction Fetch Stage"

In the instruction fetch stage (IF stage) 31, the instruction fetch unit 111 is operated.

The instruction fetch unit 111 fetches the instruction from the built-in instruction cache or the outside and inputs to an instruction queue, and outputs the instruction code to the D stage 32 in a unit of 2 to 6 bytes. Input of instructions to the instruction queue is performed in a unit of aligned 4 bytes.

When the instruction fetch unit 111 fetches the instruction from the outside under a standard access mode, it requires at least 2 clocks for the aligned 4 bytes.

Under a quad access mode, at least 5 clocks are necessary for 16 bytes.

When the built-in instruction cache is hit, fetch is possible in 1 clock for the aligned 8 bytes.

Output unit of the instruction queue is variable by every 2 bytes, and can be outputted to 6 bytes in 1 clock at a maximum. Right after the jump, the instruction queue may be bypassed and the two bytes of instruction base part is transferred directly to the instruction decoder.

Translation of the logical address of the instruction into the physical address, control of the built-in instruction cache and TLB for instruction, management of the pre-fetch destination instruction address or control of the instruction queue are performed in the IF stage 31.

(4.2.2) "Instruction Decoding Stage"

The instruction decoding stage (D stage) 32 decodes the instruction code inputted from the IF stage 31.

The instruction code is decoded once in one clock using an FHW decoder, and NFHW decoder and an addressing mode decoder in the instruction decoding unit 112, and 0 to 6-byte instruction code is consumed in one decoding (the instruction code is not consumed in the output processing of the step code including the return destination address of the return subroutine instruction).

In one decoding, an A code 42 as address calculation information and a D code 41 as an intermediate decoding result of the operation code are outputted to the A stage 33.

In the D stage 32, control of the PC calculation unit 116 of each instruction and the output processing of the instruction code from the instruction queue are performed.

In the D stage 32, pre-jump processing is performed for the branch instruction or return instruction from the subroutine. For the unconditional branch instruction which made pre-jumping, the D code 41 and A code 42 are not outputted and the instruction processing is completed in the D stage 32.

(4.2.3) "Operand Address Calculation Stage"

Processing of an operand address calculation stage (A stage) 33 is roughly divided into two.

One is the post-stage decoding processing of the operation code using the second decoder of the instruction decoding unit 112, and the other one is the calculation processing of the operand address in the operand address calculation unit 54.

In the post-stage decoding processing of the operation code, the D code 41 is inputted and the R code 43 including the entry address of the write reservation of the register and memory and the microprogram routine and parameters for the microprogram is outputted.

Incidentally, the write reservation of the register and memory is for preventing, when the content of the register or the memory referred at address calculation is rewritten by the preceding instruction in the pipeline, the wrong address calculation.

In the operand address calculation processing, the A code 42 is inputted and in accordance with the A code 42, the operand address is calculated in the operand address calculation unit 54 to output the calculation result as the F code 44.

For the jump instruction, the jump destination address is calculated and the pre-jump processing is executed. At this time, the write reservation is checked when the register is read in connection with the address calculation, and when the preceding instruction has been indicated that there is the reservation because the writing processing for the register or memory is not completed, the preceding instruction is in the waiting state until the writing processing is completed in the E stage 35.

In the A stage 33, for the jump instruction which has not pre-jumped in the D stage 32, the pre-jump processing is performed.

For a jump to the absolute value address or a jump of the register indirect addressing, pre-jumping is performed in the A stage 33. For the unconditional jump instruction performing the pre-jumping, the R code 43 and F code 44 are not outputted and the instruction processing is completed in the A stage 33.

(4.2.4) "Micro ROM Access Stage"

Processing of an operand fetch stage (F stage) 34 is also divided roughly into two.

One is the access processing of the micro ROM, particularly referred to as an R stage 37, and the other one is the operand prefetch processing, particularly referred to as an OF stage 38.

The R stage 37 and the OF stage do not necessarily operate simultaneously, the operation timing being different from each other depending upon miss and hit of the data cache, and miss and hit of data TLB.

The micro ROM access processing which is the processing in the R stage 37 is the micro ROM access and the microinstruction decode processing for generating the E code 45, which is the execution control code used in execution in the next E stage 35 for the R code 43.

In the case where one processing for the R code is decomposed into two or more microprogram steps, there may be the case where the first micro ROM unit 113 and the second micro ROM unit 114 are used in the E stage 35 and the next R code 43 is in the waiting state of micro ROM access.

Micro ROM access for the R code 43 is performed when it is not performed in the E stage 35.

In the data processor 100 of the present invention, since a number of integer operation instructions are executed in one microprogram step and many floating-point operation instructions are executed in two microprogram steps, in practice, there is a high frequency of performing the micro ROM access sequentially for the R code 43.

(4.2.5) "Operand Fetch Stage"

The operand fetch stage (OF stage) 38 executes the operand prefetch processing of the aforesaid two processings in the F stage 34.

In the operand fetch stage 38, the logical address of the F code 44 is translated into the physical address by data TLB, and by the physical address, the built-in data cache is accessed to fetch the operand, which is combined with the logical address transferred as the F code 44 and outputted as the S codes 46a, 46b.

In one F code 44, though an 8-byte border may be crossed, the operand fetch less than 8 bytes is selected.

In the F code 44, selection whether or not to access the operand is involved, and when the operand address itself or the immediate value calculated in the A stage 33 is transferred to the E stage 35, the operand prefetch is not performed and the content of F code 44 is transferred as the S codes 46a, 46b.

In the case where the operand to be prefetched and the operand to be written by the E stage 35 are coincided, the operand prefetch is not performed from the built-in data cache but through the by-path.

The operation of the operand store stage 36 is performed in the operand access unit 120, and the address translation processing and the permuting processing of the built-in data cache, in the case the data TLB or the built-in data cache made a miss, are also performed.

(4.2.6) "Execution Stage"

The execution stage (E stage) 35 operates with the E code 45 and the S codes 46a, 46b as inputs.

The E stage 35 is the instruction executing stage, thus the processings performed in stages before and in the F stage 34 are all pre-processings for the E stage 35.

When a jump is performed or the EIT processing is started in the E stage 35, the processings from the IF stage 31 to the F stage 34 are all repealed.

The E stage 35 is controlled by the microprogram and executes the instruction by executing a series of instructions from the entry address of the microprogram routine indicated in the R code 45.

In the E code 45, there are a code (particularly referred to as an EI code) which controls the integer operation unit 117, and a code (particularly referred to as an EF code) which controls the floating-point operation unit 118. The EI code and EF code are able to output independently, and at this time, in the E stage 35, the integer operation unit 117 and the floating-point operation unit 118 operate in parallel.

For example, when executing the floating-point instruction having no memory operand in the floating-point operation unit 118, this operation is executed in parallel to the operation of the integer operation unit 117.

In both the integer operation and the floating-point operation, read-out of the micro ROM and execution of the microinstruction is executed in the pipeline processing. Accordingly, when the branch occurs in the microprogram, there is a space of one microstep.

In the E stage 35, the write reservation for the register or memory performed in the A stage 33 is released after writing the operand.

Various interruptions are received directly in the E stage 35 at an interval of instructions, and the necessary processing is executed by the microprogram. The other various EIT processings are also performed in the E stage 35 by the microprogram.

When the operation result must be stored in the memory, the E stage 35 outputs the W codes 47a, 47b and the program counter value of the instruction performing the storing processing to the S stage 36.

(4.2.7) "Operand Store Stage"

The operand store stage 36 translates the logical address 47a of the W code into the physical address by data LTB, and stores data 47b of the W code in the built-in data cache by the address. Simultaneously, the operand store stage 36 inputs the W codes 47a, 47b and the program counter value in the store buffer, and processes to store the W code data 47b in the external memory using the physical address outputted from the data TLB.

The operation of the operand store stage 36 is performed in the operand access unit 120, and also the address translation processing and the permuting processing of the built-in data cache, in the case where the data LTB or the built-in data cache made a miss are performed.

When an EIT is detected in the store processing of the operand, while holding the W codes 47a, 47b and the program counter value in the store buffer, the EIT is noticed to the E stage 35.

(4.3) "State control of Each Pipeline Stage"

Each pipeline stage includes an input latch and an output latch, and basically, operates independently of the other stages.

Each of the stages, when the processing performed one before is completed, transfers the processing result to the input latch in the next stage from the own output latch, and starts the next processing when all of the input signals necessary for the next processing are ready in the input latch of the own stage.

That is, each stage starts the next processing when all of the input signals for the next processing outputted from the preceding stage become effective, and the processing result at that time point is transferred to the input latch of the later stage, and the output latch becomes empty.

All input signals must be ready at the timing immediately before each of the stages starts the operation. In the case where the input signals are not ready, this stage becomes the waiting state (input waiting).

When transferring from the output latch to the input latch of the next stage, the input latch of the next stage must be empty. Even in the case where the next stage input latch is not empty, the pipeline stage is in the waiting state (input waiting).

When the cache or the TLB made a miss or data interference occurs between the instructions being processed in the pipeline, a plural number of clocks are necessitated for the processing of one stage, results in delay of the pipeline processing.

(5) "Detailed Description of Operation of Operand Access Unit"

(5.1) "Configuration of Operand Access Unit"

Figure 23:
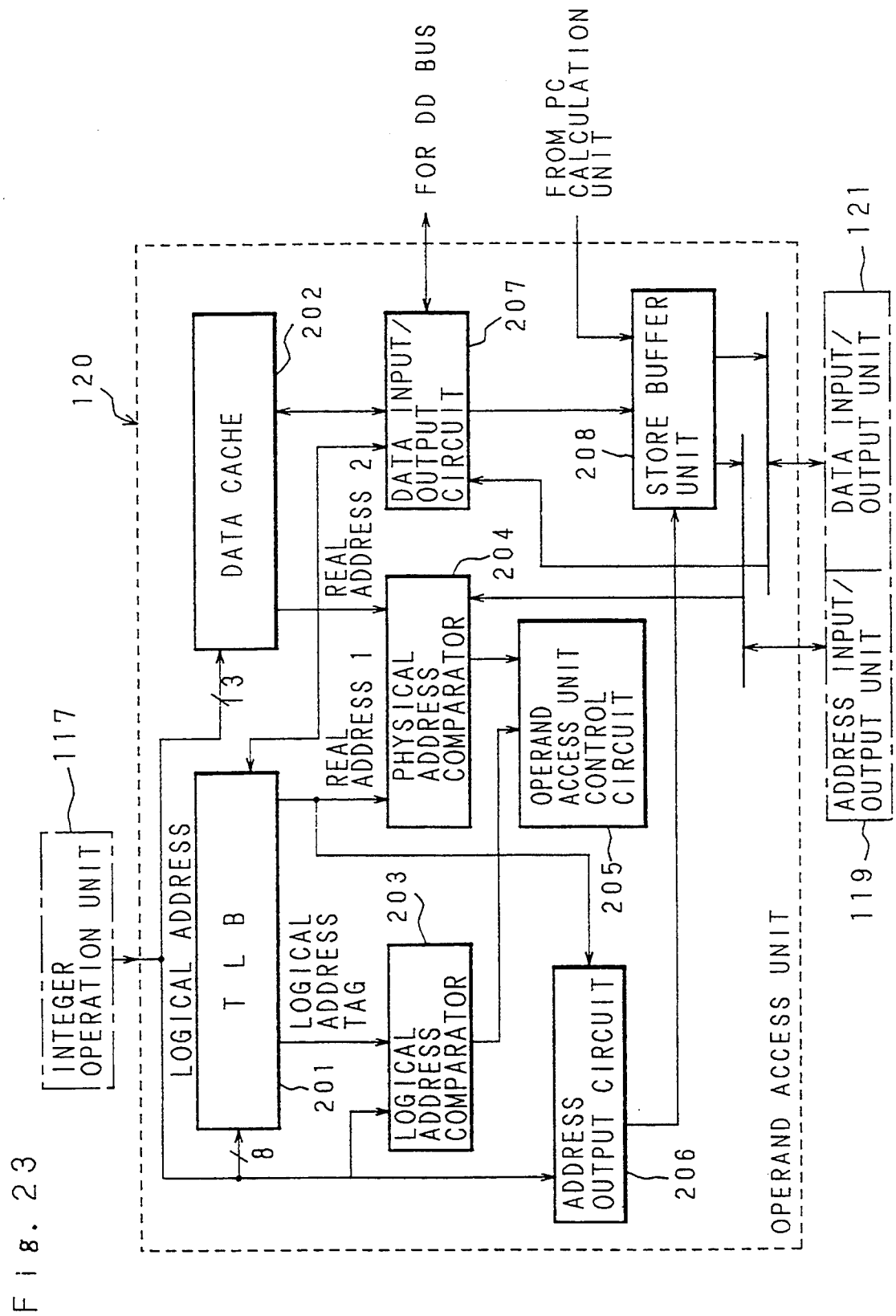
FIG. 23 is a block diagram showing a detailed configuration of an operand access unit of a data processor of the present invention.

A detailed block diagram of an operand access unit 120 is shown in FIG. 23.

The operand access unit 120 is constituted by the TLB 201 in which the logical address and the physical address of data are buffered in a pair, the built-in data cache 202 in which the physical address and data are buffered in a pair, a logical address comparator 203 which compares the high-order logical address of accessed data and the logical address tag of the TLB 201, a physical address comparator 204 which compares the physical address outputted from the TLB 201 and the physical address tag outputted from the data cache 202, a data input/output circuit 207, an address output circuit 206, a store buffer unit 208 and further, an operand access unit control circuit 205 which controls the whole unit in accordance with the comparison results of the logical address comparator 203 and the physical address comparator 204.

(5.2) "Data Read Operation of Operand Access Unit"

Entry of the TLB 201 is specified by the low-order 8 bits in the high-order 20 bits which are subjected to the address translation in the logical address outputted from the integer operation unit 117. From the specified entry of the TLB 201, the logical address tag (12 bits) and the physical address (20 bits) are outputted.

At this time, when the high-order 12 bits of the logical address and the logical address tag are coincided, it is regarded that the TLB 201 has hit, thus the physical address outputted from the TLB 201 is effective.

Also, the entry of the data cache 202 is specified by the low-order bits (12 bits) which indicate the page offset in the logical address and are not translated into the physical address. From the specified entry of the data cache 202, the physical address tag (20 bits) and data are outputted.

At this time, when the physical address outputted from the TLB 201 is effective and it coincides with the physical address tag, it is regarded that the data cache 202 has hit, thus the data outputted from the data cache is effective.

In the case where the TLB 201 made a miss, by accessing an address translation table in the external memory of the data processor 100 of the present invention by control of the operand access unit control circuit 205, the logical address is translated into the physical address and the entry of the TLB 201 is updated. After updating the TLB 201 entry, the TLB 201 is accessed again and hits.

In the case where the TLB 201 hits but the data cache 202 makes a miss, by accessing the external memory by the physical address by control of the operand access unit control circuit 205, the entry of the data cache 202 is updated.

When the TLB 201 made a miss, the data cache 202 does not hit even when the physical address read from the TLB 201 and the physical address tag of the data cache are coincided. In this case, hit or miss of the data cache 202 is judged after the TLB 201 entry has been updated and the TLB 201 has hit.

(5.3) "Data Write Operation of Operand Access Unit"

Data write operation for the operand access unit 120 is similar to the data read operation with respect to accessing of the TLB 201.

Though the write operation of the data cache 202 resembles the data read operation, data is not read out from the data cache 202.

In the data write operation, data are written in the entry which is hit when the data cache 202 has hit. At a miss, data are not written in the entry of the data cache 202 and the entry is also not updated.

The built-in data cache 202 of the data processor 100 of the present invention is a write-through control data cache, thus stored data is outputted to the outside in either case of hit or miss of the data cache 202 in the data write operation.

For storing processing of data to the outside, 2 clock cycles are necessary at a minimum, which is slower than the storing operation speed of the E stage 35 of the data processor 100 of the present invention. Accordingly, the store data is registered once in the store buffer together with the address of the instruction executing the storing operation, the physical address and the logical address of the storing destination, and then the store buffer performs the storing operation.

The address of the instruction which executes the storing operation and is registered in the store buffer is the logical address of the instruction inputted from the PC calculation unit 116.

(6) "External Access Operation"

(6.1) "Input/Output Signal Line"

Figure 24:
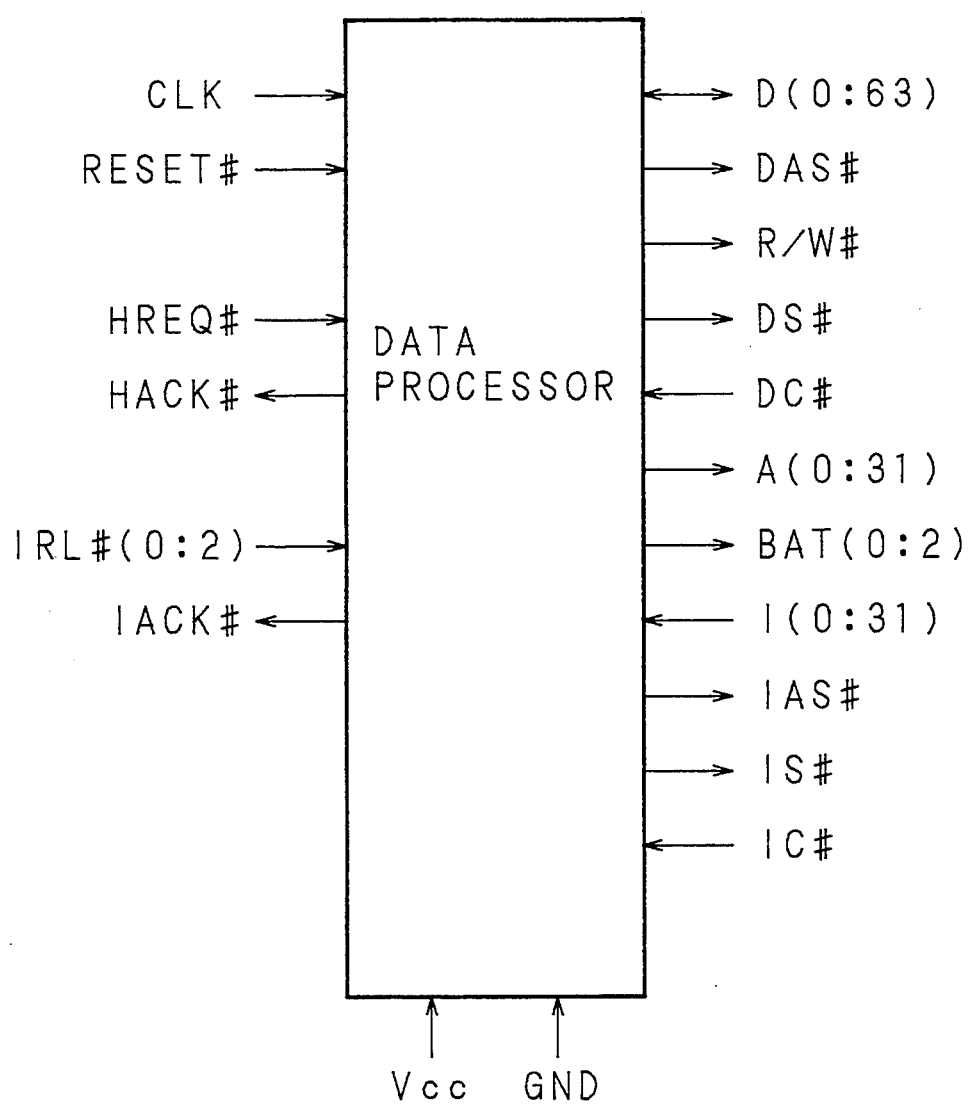
FIG. 24 is a schematic view showing the input/output signals of a data processor of the present invention.

FIG. 24 is a schematic view showing the input/output signals of the data processor 100 of the present invention.

To and from the data processor 100 of the present invention, besides a power source Vcc and ground GND, 64 data pins, 32 access pins, 32 instruction pins and an input clock CLK, various control signals are inputted and outputted.

In both cases of instruction access and data access, the physical address is outputted to the address pins.

The CLK is an external input clock which has a same frequency as an operation clock of the data processor 100 of the present invention.

Data address strobe DAS# (# represents a negative logic) indicates that the data address outputted to the address pin is effective.

Read write R/W# discriminates whether a bus cycle at the data pin is the input or output.

Data strobe DS# indicates that the data processor 100 of the present invention has completed data input preparation, or that data is outputted from the data processor 100 of the present invention.

DC# is a signal which notices the data processor 100 of the present invention to complete a data access cycle.

BAT(0:2) shows the meaning of values of the address pin, data pin and instruction pin as shown in FIG. 25.

Instruction address strobe IAS# indicates that the instruction address outputted to the address pin is effective.

Instruction strobe IS# indicates that the data processor 100 of the present invention has completed instruction input preparation.

IC# is a signal which notices the data processor 100 of the present invention to allow completion of an instruction access cycle.

Hold request HREQ# is a signal which requests the bus authority to the data processor 100 of the present invention, and HACK# is a signal which indicates that the data processor 100 of the present invention has accepted the hold request HREQ# and given the bus authority to the other device.

IRL(0:2) is an external interruption request signal.

IACK# is a signal which indicates that the data processor 100 of the present invention has accepted the external interruption and performing an interruption vector access cycle.

(6.2) "Access of External Devices"

In an example of the system shown in FIG. 1 using the data processor 100 of the present invention, the data processor 100 of the present invention and the data caches 107, 108 are connected also at the BAT(0:2), DAS#, R/W#, DS# and DC# besides the data bus 102 connected to the data pins and the address bus 101 connected to the address pins.

The data processor 100 of the present invention and the instruction cache 11 are connected also at the BAT(0:2), IAS#, IS# and IC# besides the instruction bus 103 and the address bus 101 connected to the instruction pins.

The CLK is a clock fed to the entire system and deciding the basic timing of the system.

At the time of bus access in a standard access mode, the data access using the data bus 102 and the instruction access using the instruction bus 103 are performed respectively for the external memory having a sufficient high speed, at the speed of once in two cycles of the external input clock CLK.

At the time of bus access in a quad access mode, the data access using the data bus 102 and the instruction access using the instruction bus 102 are performed respectively for the external memory having a sufficient high speed, at the speed of four times in five cycles of the external input clock CLK.

The address bus 101 is utilized for accessing both the data caches 107, 108 and the instruction cache 106.

(7) "Exception Processing Function of the data processor of the Present Invention"

(7.1) "Types of EIT detected by the Data Processor of the Present Invention"

As the EIT occurs in the data processor 100 of the present invention, as the EIT not depending on the instruction, there are a missing page exception which is detected when there are no data and instruction corresponding to the logical address accessed on the main memory 109 and the page fault has occurred, and address translation exception which occurs when an error occurs while translating the logical address into the physical address, and a violence access related to memory protection violation and the I/O area occurs, and a bus access exception which occurs when there is no response from the bus within a predetermined time and the memory access is not executed in the instruction or operand access.

As the EIT occurs depending the instruction, there are an odd address jump trap which occurs when the jump destination address of the jump instruction is an odd number, a reserve instruction exception which occurs when the unallocated instruction and a bit pattern of the addressing mode are to be executed, a zero divide trap which occurs when zero divide is performed in the integer operation, a floating-point operation trap which occurs when the unmasked exception is detected at executing the floating-point instruction, an unconditional trap which occurs by the TRAPA instruction and a conditional trap which occurs by the TRAP/cc instruction.

In addition, there are a self debug trap which occurs when the instruction address hits a breakpoint or the instruction is executed in the single step mode, and further, an external interruption which occurs by external hardware signals and a debugger interruption which is a hardware trap for incircuit emulator.

(7.2) "Operation at starting EIT Processing Handler"

In the data processor 100 of the present invention, when the EIT is detected, the microprogram according to the following procedures is executed and the EIT processing handler is started.

Firstly, a vector number responsive to the detected EIT is generated in the data processor 100 of the present invention.

Secondly, an EIT vector table which is on the memory space, and in which a start address of the processing handler relative to respective EITs and an EIT vector are stored in a pair is accessed.

Each entry of the EIT vector table is constituted by 8 bytes, and data for updating processor status word (PSW) of the data processor 100 of the present invention before the processing is moved to the EIT processing handler is included.

Thirdly, NEXTPC which is the logical address of the return destination instruction for returning to the original instruction sequence after returned from the EIT processing handler, PSW before staring the EIT and EITINF which is various information related to the detected EIT such as the detected EIT number are saved in the stack.

Moreover, when necessary, information such as the logical address of the instruction detecting the EIT is saved in the stack.

Figure 26:
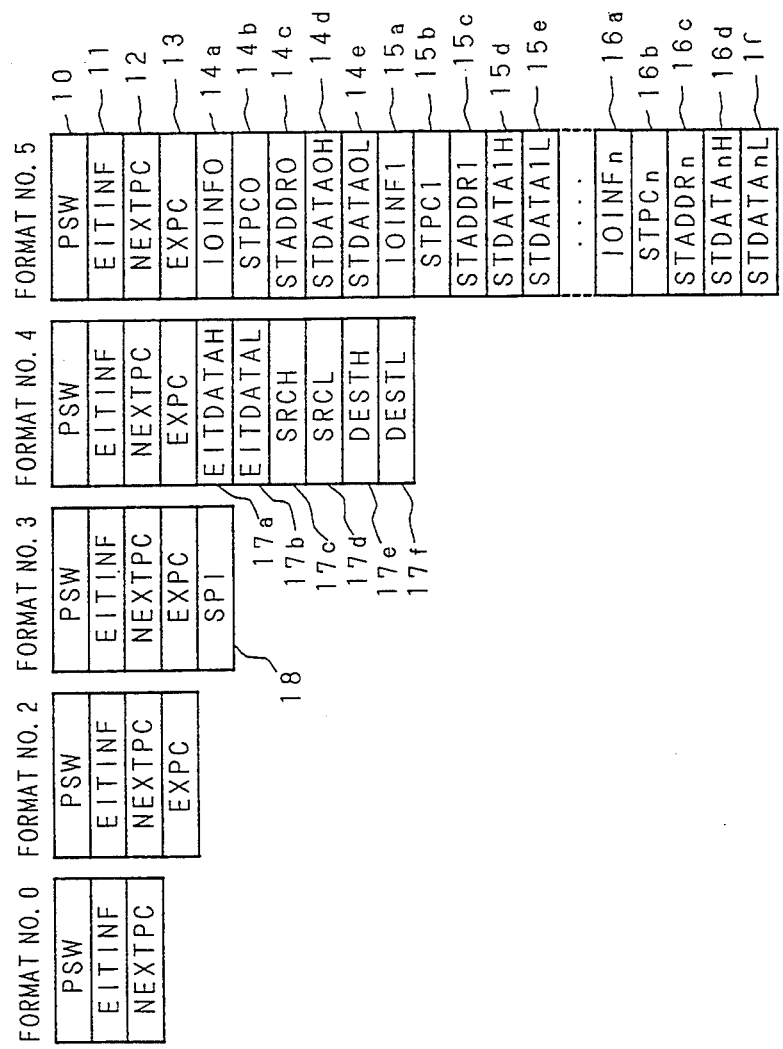
FIG. 26 is a schematic view showing formats of an EIT stack frame of a data processor of the present invention.

The stack frame generated by these processings are dependent on the types of EIT, and classified into five formats as shown in FIG. 26.

Fourthly, PSW is updated in response to the EIT vector table entry which is read in. At this time, when the reserved value tends to be set in the PSW, a system error occurs. By updating the PSW, a ring number which becomes memory protection information can be updated and the presence or absence of the address translation, debug environment, interruption mask level and floating-point operation trap receipt mode can be permuted.

Finally, a jump to the PC value fetched from the EIT table entry is performed and the EIT processing handler is started. When the EIT is detected in multiple and the unprocessed EIT is not inhibited, before executing the start instruction of the EIT processing handler, processing for starting the EIT processing handler for the unprocessed EIT is performed.

(7.3) "Return Operation to Original Instruction Train from EIT Processing Handler"

After completing the processing corresponding to each EIT by the EIT processing handler, in the REIT instruction executed at the end in the EIT processing handler, the microprogram which performs the following processings is executed, and the processing returning to the original instruction train is performed.

Firstly, the PSW value and EITINF at the time point where the EIT is detected are read from the stack, and successively, logical address of the return destination instruction is read from the stack.

Moreover, by format information in the EITINF, it is judged whether additional information is present, in the case where there is the additional information, it is read from the stack. The additional information differ respectively depending on five formats shown in FIG. 26.

Secondly, all fields of the PSW are returned to the value before the generation of EIT according to the PSW value at the time point where the EIT read from the stack is detected.

When returning from the EIT of format 5, there is a case wherein reexecution of the write cycle is performed during execution of the REIT instruction by the store buffer producing the EIT. In this case, as the logical address and store data necessary for the reexecution of the write cycle, STADDR, STDATAH and STDATAL in the additional information on the stack are used.

Thirdly, a jump to the logical address of the return destination instruction read from the stack is executed, and returned to the original instruction train.

(7.4) "Details of EIT Stack Frame"

An EIT stack frame which is saved in the stack in connection with detection of the EIT and is information becoming a parameter to the EIT processing handler, is classified into five formats shown in FIG. 26 depending on the EIT processing.

A format of format No. 0 is the format of the stack frame formed at the time of reserve instruction exception and external interruption.

A format of format No. 2 is the format of the stack frame formed at the time of the self debug trap, odd address jump trap, zero divide trap, conditional trap unconditional trap.

A format of format No. 3 is the format of the stack frame formed at the time of the debugger interruption.

A format of format No. 4 is the format of the stack frame formed at the time of the floating-point operation trap.

A format of format No. 5 is the format of the stack frame formed at the time of the missing page exception, address translation exception and bus access exception.

In FIG. 26, PSW 10 is a PSW value of the data processor of the present invention at the time point where the EIT is detected, EITINF 11 is control information related to the EIT such as the stack format and EIT number of the EIT frame, NEXTPC 12 is a logical address of the instruction executed by the REIT instruction after returning from the EIT processing handler, EXPC 13 is a logical address of the instruction executed in the E stage 35 at detection of the EIT, IOIFO 14$a$, IOINFI 15$a$, IOINFn 16$a$ are information for the memory access related to unprocessed data in the store buffer, STPCO 14$b$, STPC1 15$b$, STPCn 16$b$ are logical addresses of the instruction executing the storing operation related to unprocessed data in the store buffer, STADDR0 14$c$, STADDR1 15$c$, STADDRn 16$c$ are storing destination logical addresses of unprocessed data in the store buffer, SDATA0H 14$d$, STDATA1H 15$d$, STDATAnH 16$d$ are high-order 4 bytes of unprocessed data in the store buffer, SDATA0L 14$e$, STDATA1L 15$e$, STDATAnL 16$e$ are low-order 4 bytes of unprocessed data in the store buffer, EITDATAH 17$a$ is high-order 4 bytes of data causing the detection of exception in the floating-point operation, EITDATAL 17$b$ is low-order 4 bytes of data causing the detection of exception in the floating-point operation, SRCH 17$c$ is high-order 4 bytes of the first operand of the operation causing the detection of exception in the floating-point operation, SRCL 17$d$ is low-order 4 bytes of the first operand of the operation causing the detection of exception in the floating-point operation, DESTH 17$e$ is high-order 4 bytes of the second operand of the operation causing the detection of exception in the floating-point operation, DESTL 17$f$ is low-order 4 bytes of the second operand of the operation causing the detection of exception in the floating-point operation and SPI 18 is a stack pointer for interruption processing at the time point of EIT detection.

Figure 27:
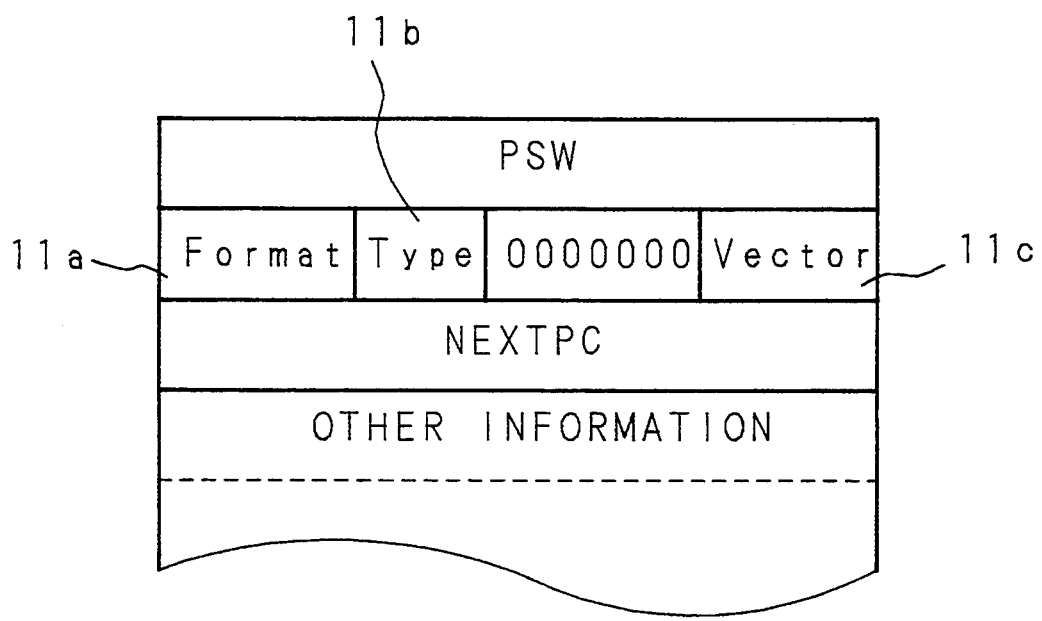
FIG. 27 is a schematic view showing the detail of upper information of an EIT stack frame.

FIG. 27 is a schematic view particularly showing the high-order byte portion of respective formats of the stack frame related to the EIT shown in FIG. 26.

The EITINF 11 in FIG. 26 comprises a format 11$a$ which is the stack format number represented by 8 bits, a type 11$b$ which is the EIT type number represented by 8 bits and a vector 11$c$ which is the EIT vector number represented by 9 bits.

The Type 11$b$ indicates priority of receiving the EIT. The Vector 11$c$, Type 11$b$ and Format 11$a$ of each EIT are as shown in FIG. 28.

Figure 29:
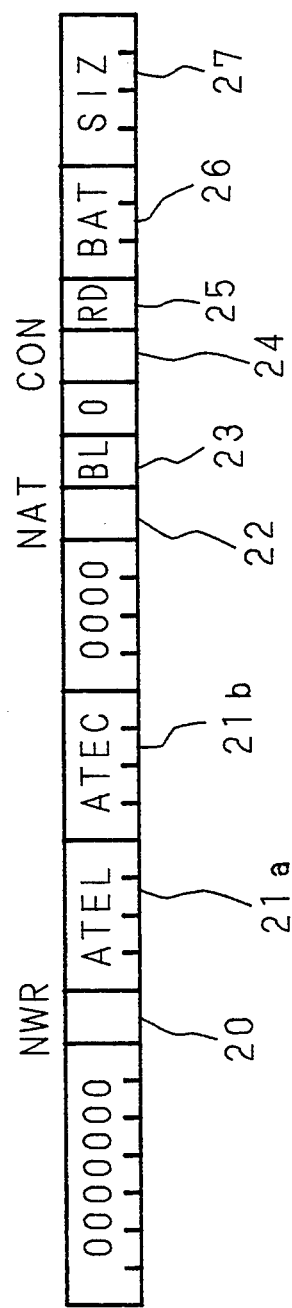
FIG. 29 is a schematic view showing the detail of IOINF in the EIT stack frame, FIGS. 30 (a) and (b) are a flow chart showing an example of processing procedure at starting an EIT processing handler, FIGS. 31 (a) and (b) are a flow chart showing an example of processing procedure when the EIT inhibited is detected and an EIT processing handler is started, at returning from the EIT processing handler of a data processor of the present invention.

FIG. 29 is a schematic view showing the detailed contents of the IOINFO 14$a$, IOINF1 15$a$, IOINFn 16$a$ shown in FIG. 26. All of these have a uniform format as shown in FIG. 29.

NWR 20 is a bit indicating the necessary/unnecessary of write retry in the REIT instruction, when NWR=0, write retry is necessary and when NWR=1, write retry is unnecessary.

ATEL 21$a$ is 4-bit information showing the location where the address translation exception occurs.

ATEC 21$b$ is a 4-bit error code showing the types of error related to the memory access.

NAT 22 is a bit showing the presence of address translation, when NAT=0, it shows that there is the address translation, and when NAT=1, it shows that there is no address translation.

BL 23 is a bit showing whether the bus cycle is in the bus lock state, when BL=0, it shows that it is not in bus lock and when BL=1, it shows that it is in bus lock.

CON 24 is a bit showing the presence of continuation of unprocessed data to be write retried, when CON=0, a set of IOINF, STPC, STADDR, STDATAH of the unprocessed data is not continued, and when CON=1, it is continued.

RD 25 is a bit showing classification of the bus cycle, when RD=0, it is the write access, and when RD=1, it is the read access.

BAT 26 shows the types of bus cycle produced by the EIT.

SIZ 27 shows the data size when write retry is performed.

As described above, in the data processor 100 of the present invention, the stack frame including a great amount of information is formed responsive to the EIT to give necessary information to the EIT processing handler.

Particularly, in the format of format No. 5, besides saving both the instruction address related to data being processed in the store buffer, and the instruction address in the processing completion step in the E stage 35 in the stack, the presence of continuation of a set of IOINF, STPC, STADDR, STDATAH, STDATAL is specified by the CON 24 in the IOINF, and sufficient information are saved in the stack even when the EIT is detected in the state where a plural number of unprocessed data are present in the store buffer.

(7.5) "Example of Operation at Starting the EIT Processing Handler"

Figure 30A:
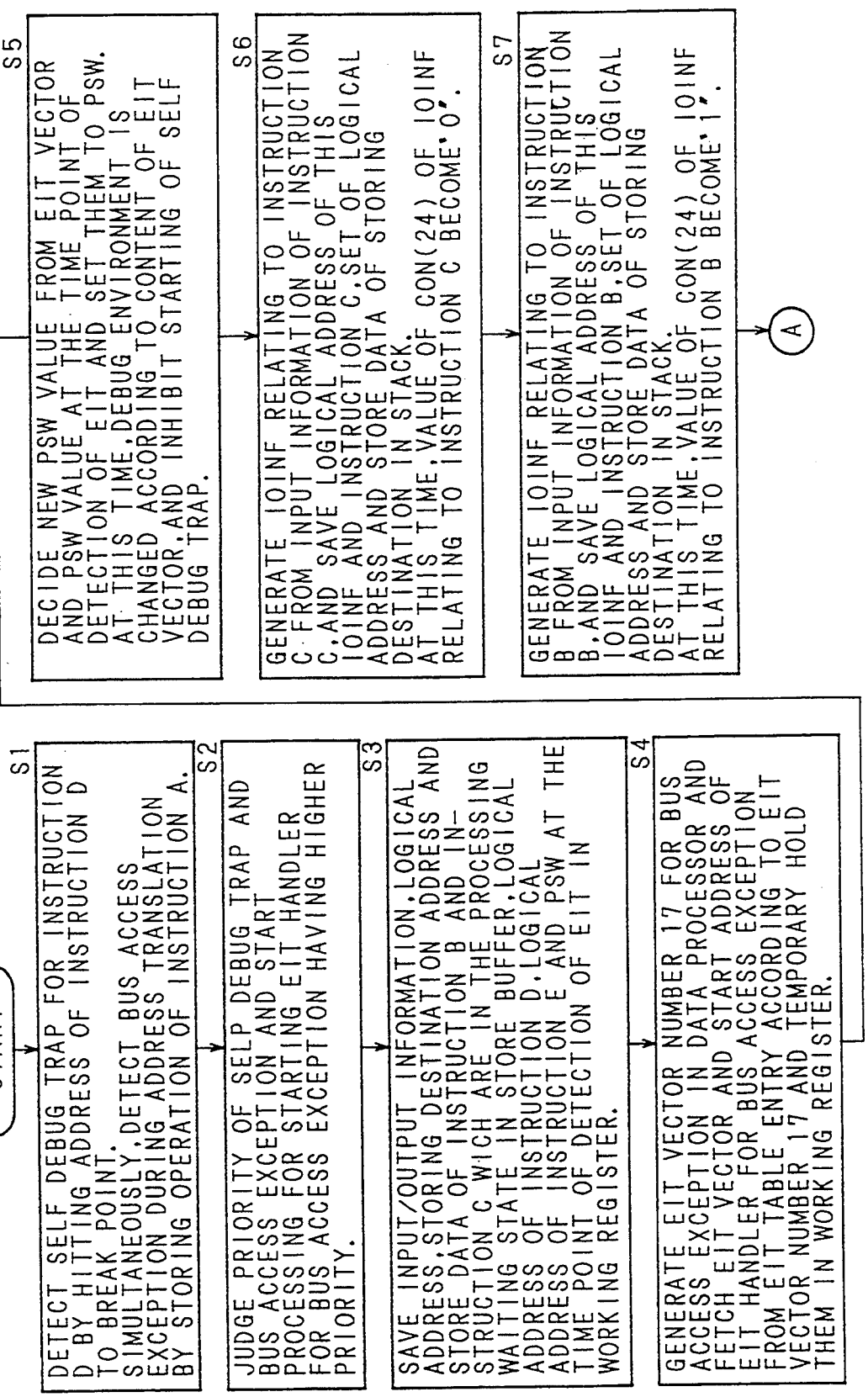

Here, with reference to a flow chart shown in FIGS. 30 ($a$) and ($b$), an example of operation from the detection of EIT to the starting of EIT processing handler in the data processor 100 of the present invention, will be described.

During processing of storing operation of an operand of an instruction A in a store buffer, operand storing operation of an instruction B and operand storing operation of an instruction C following the instruction B are received in the store buffer, and the operand storing operation of the instruction A is in the completion waiting state, and further, in the E stage 35, processing of an instruction D following the instruction C is completed, then at the time point where an instruction E following the instruction D is not processed, the address of the instruction D hits a break point and the self debug trap is detected (Step S1).

Simultaneously, a bus error occurs by the operand storing operation of the instruction A and the bus access exception is detected (Step S1).

Next, priority of the self debug trap and the bus access exception is judged, and the processing for starting the EIT processing handler for the bus access exception having higher priority is started (Step S2).

The input/output information, logical address, storing destination logical address and store data of the instructions B and C which are in the processing waiting state in the store buffer, the logical address of the instruction D, the logical address of the instruction E, and further, the PSW value at the time point of EIT detection are saved in the working register (Step S3).

Next, the EIT vector No. 17 for the bus access exception is generated in the data processor, and from the EIT table entry corresponding to the EIT vector No.

17, the EIT vector and the start address of the EIT handler corresponding to the bus access exception are fetched and these are held once in the working register (Step S4).

Next, from the EIT vector and the PSW value at the time point of EIT detection, a new PSW value is determined and set in the PSW. At this time, the debug environment is switched over in accordance with the content of the EIT vector and the starting of the self debug trap is inhibited (Step S5). Accordingly, the starting of the self debug trap is inhibited by the EIT vector fetched by the processing at starting the EIT processing handler of the bus access exception.

Next, IOINF related to the instruction C is generated from input/output information of the instruction C, and together with the logical address of the instruction C, the operand storing destination logical address of the operand and store data, saved in the stack in a set. At this time, a value of the CON 24 of IOINF related to the instruction C becomes "0" (Step S6).

Next, IOINF related to the instruction B is produced from input/output information of the instruction B, and together with the logical address of the instruction C, the operand storing destination logical address and store data, saved in the stack in a set. At this time, a value of the CON 24 of IOINF related to the instruction B becomes "1" (Step S7).

Next, IOINF related to the instruction A is generated from input/output information of the instruction A, and together with the logical address of the instruction C, the storing destination logical address of the operand and store data, saved in the stack as a set. At this time a value of the CON 24 of IOINF related to the instruction A becomes "1" (Step S8).

Next, the logical address of the instruction D is saved in the stack as EXPC 13 (Step S9).

Next, the logical address of the instruction E is saved in the stack as NEXTPC 12 (Step S10).

Next, the EIT vector No. 17, EIT, type No. 1 and stack format No. 5 of the bus access exception are saved in the stack as EITINF (Step S11).

Then, a PSW value at the time point of generation of EIT is read from the working register and saved in the stack (Step S12).

Finally, the start address of the EIT processing handler is read from the working register and the jump processing to the instruction of the address read from executed (Step S13).

In this example, since reprocessing of the write cycle related to the instructions A, B and C are necessary, three sets of IOINF, STPC, STADDR, STDARAH, STDATAL for respective instructions are saved in the stack.

Store information related to the instruction C is saved in the lowermost area of the stack as the IOINF2, STPC2, STADDR2, STDATA2H and STDATA2L, and CON of the IOINF2 which is the IOINF related to the instruction C becomes "0".

Store information related to the instruction B is saved in the second area from the bottom of the stack as the IOINF1, STPC1, STADDR1, STDATA1H and DTDATA1L, and CON of the IOINF1 which is the IOINF related to the instruction B becomes "1".

Store information related to the instruction A is saved in the third area from the bottom of the stack as the IOINF0, STPC0, STADDR0, STDATA0H and STDATA0L, and CON of the IOINF0 which is the IOINF related to the instruction A becomes "1".

Also, the EXPC 13 becomes the logical address of the instruction D and the NEXTPC 11 becomes the logical address of the instruction E.

(7.6) "Example of Operation at Returning from EIT Processing Handler"

After removing the cause of bus access exception related to the storing operation of the instruction A by the EIT processing handler aforementioned, the REIT instruction is executed to return to the instruction E.

Figure 31A:
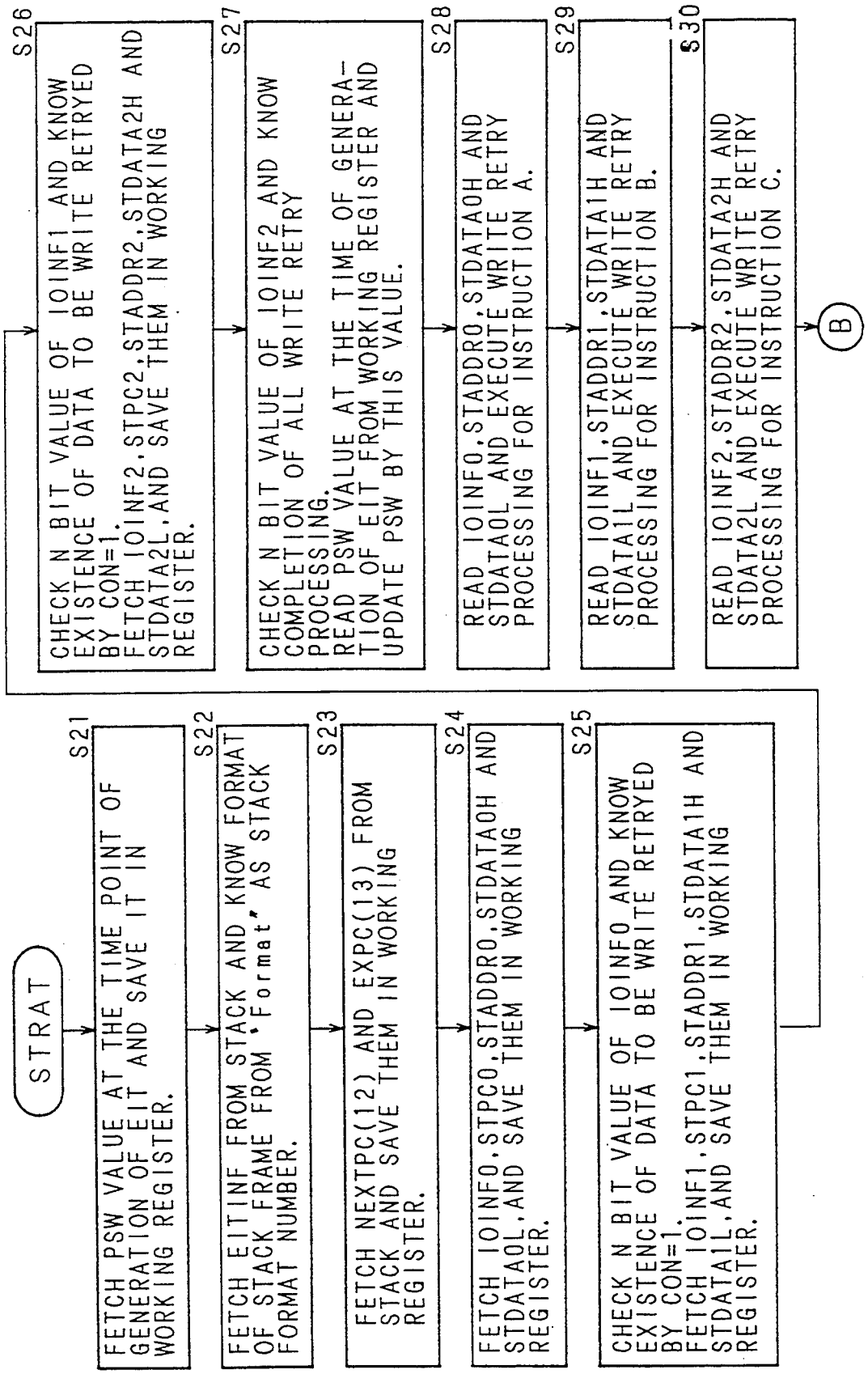
Figure 31B:
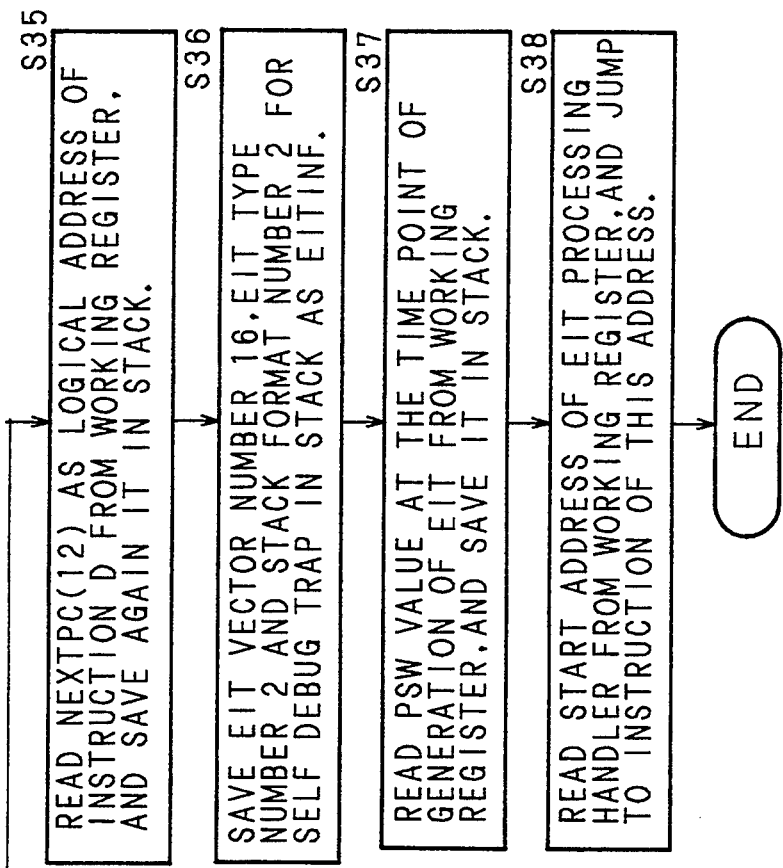
Figure 31B:
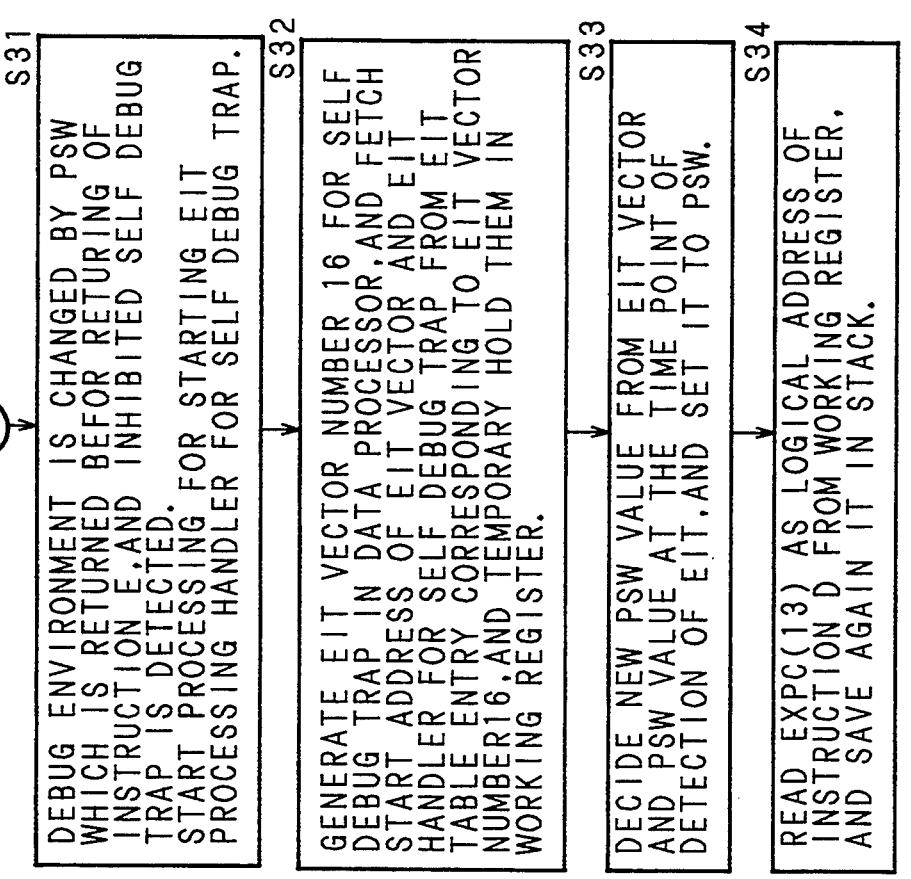

FIGS. 31(a) and (b) are a flow chart showing the executing operation procedure of the aforesaid REIT instruction.

First, a PSW value at the time point of generation of EIT is fetched from the stack and saved in the working register (Step S21).

Next, EITINF is fetched from the stack, and from the Format which is the stack format No., a stack frame format is identified (Step S22).

Next, NEXTPC 12 and EXPC 13 are fetched from the stack and saved in the working register (Step S23).

Next, IOINF0, STPC0, STDATA0H and STDATA0L are fetched from the stack and saved in the working register (Step S24).

Next, the CON bit of the IOINF0 is checked. As the result is "1", and further, it represents that data to be write retried is present, the IOINF1, STPC1 STDATA1H and STDATA1L are fetched from the stack and saved in the working register (Step S25).

Next, the CON bit of the IOINF1 is checked. As the result is "1", and further, it represents that data to be write retried is present, the IONINF2, STPC2, STDATA2H and STDATA2L are fetched from the stack and saved in the working register (Step S26).

Next, the CON of the IOINF2 is checked. As the result is "0", data to be write retried is already gone. That is, the write retry processing is entirely completed, so that the PSW at the time point of generation of EIT is read from the working register and, by this value, the PSW is updated (Step S27).

Next, IOINF0, STPC0, STDATA0H and STDATA0L are read from the working register, and the write retry processing for the instruction A is executed (Step S28).

Next, IOINF1, STPC1, DTDATA1H and STDATA1L are read from the working register, and the write retry processing for the instruction B is executed (Step S29).

Next, IOINF2, STPC2, STDATH2H and STDATA2L are read from the working register, and the write retry processing for the instruction C is executed (Step S30).

Next, the debug environment is switched over by the PSW returned before returning to the instruction E, and the inhibited self debug trap is detected, and the processing for starting the EIT processing handler for the self debug trap is started (step S31).

Next, the EIT vector No. 16 for the self debug trap is generated in the data processor, and from the EIT table entry corresponding to the EIt vector No. 16, the EIT vector and the start address of the EIT handler for the self debug trap are fetched, which are held once in the working register (Step S32).

A new PSW value is decided from the EIt vector and the PSW value at the time point of detection of EIT and set in the PSW (Step S33).

Next, the EXPC 13 which is the logical address of the instruction D is read from the working address, and saved in the stack (Step S34).

Next, the NEXTPC 12 which is the logical address of the instruction E is read from the working register, and saved in the stack (Step S35).

Next, the EIT vector No. 16, EIT type No. 2 and stack format No. 2 for the self debug trap are saved in the stack as EIINF (Step S36).

Then, the PSW value at the time point of generation of EIT is read from the working register and saved in the stack (Step S37).

Finally, the start address of the EIT processing handler is read from the working register and a jump to the address is executed (Step S38).

In this example, before returning to the original instruction train by jumping to the instruction E, write retries of the storing operations of the instructions A, B and C is executed.

It is possible to find out the number of data to be write retried, by checking sequentially the CON bit in IOINF related to respective instructions.

That is, when CON=1, the data to be write retried further is present in the stack, and when IOINF whose CON=0 and STPC, STADDR, STDATAH, STDATAL related thereto are read, data to be write retried further is not saved in the stack. And finally, the self debug trap for the instruction D, which was inhibited when the PSW is returned by the REIT instruction, is started.

Figure 32:
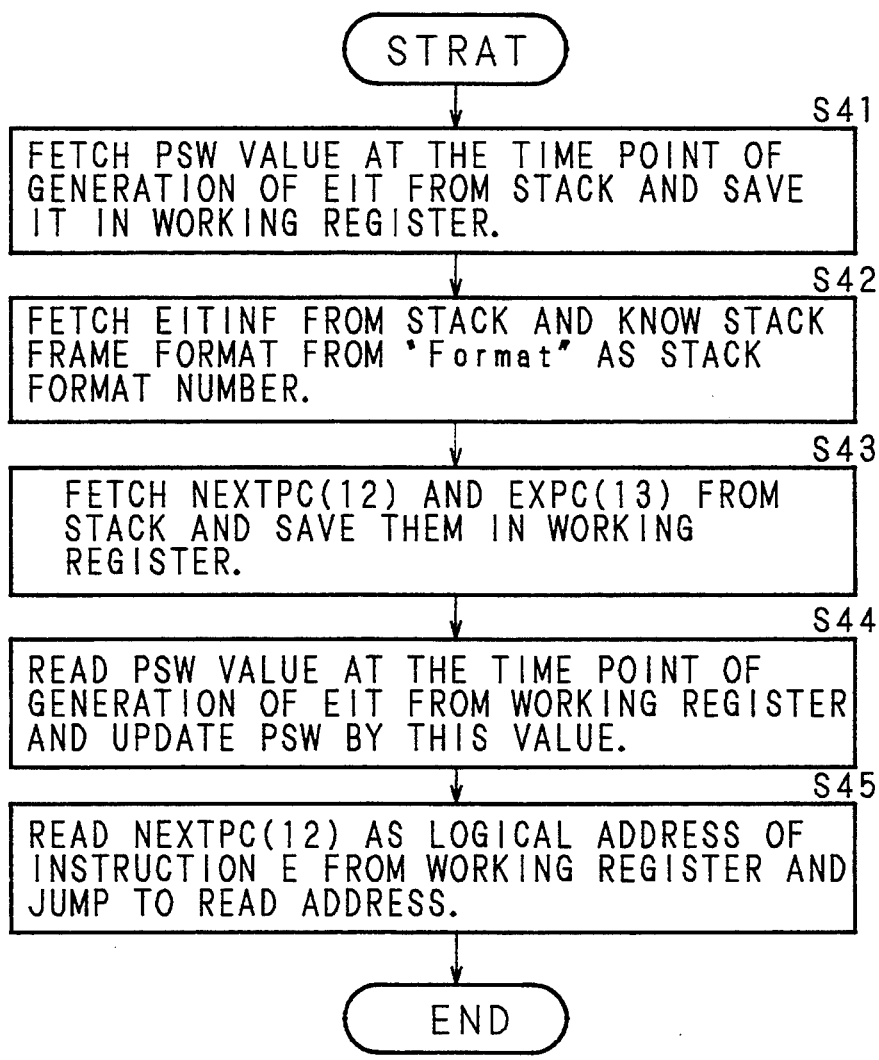
FIG. 32 is a flow chart showing an example of processing procedure of the returning processing from an EIT processing handler of a data processor of the present invention.

FIG. 32 is a flow chart showing the procedures at moving to the execution of instruction E after returning from the self debug trap of the instruction D.

First, the PSW value at the time point of generation of EIT is fetched from the stack and saved in the working register (Step S41).

Next, EITINF is fetched from the stack and the stack frame format is known from Format which is the stack format number (Step S42).

Next, the NEXTPC 12 and EXPC 13 are fetched from the stack and saved in the working register (Step S43).

Then, the PSW value at the time point of generation of EIT is read from the working register and PSW is updated by this value (Step S44).

Finally, the NEXTPC 12 which is the logical address of the instruction E is read from the working register 12, and processing for jumping to the address read from is executed (Step S45).

(8) "Other Embodiments of the Present Invention"

The embodiment aforementioned is an example embodying the present invention in a data processor having the 3-stage buffer. However, since the EIT stack frame of the format of format No. 5 can be coped with by the same format even when the number of stages of the store buffer is changed, it is to be understood that the present invention is applicable in the data processor having the store buffer of 4 or 5 stages or more. It is also possible to apply in the data processor having a single-stage store buffer.

Furthermore, in the EIT stack frame of format No. 5 of the data processor of the present invention, the format in the case of saving various information in the stack is shown. However, a format of the EIT stack frame which does not include a portion of these information may be decided additionally to save the information in the stack according to the format at the starting of the EIT processing handler, and to process unprocessed data according to the format in the EIT processing handler.

As particularly described heretofore, in a first invention of a data processor of the present invention, when there is unprocessed data in the store buffer and the exception occurs at the time point where the instruction is completed in the instruction execution stage, the unprocessed data in the store buffer, the instruction address related to the data and the address of the instruction in the execution completion stage in the execution stage are saved in the stack, so that in the exception processing handler, the instruction address related to the data whose processing in the store buffer is not completed and the instruction address whose processing in the execution stage is completed can both be obtained. This function is particularly effective when the instruction which has been processed in the instruction execution stage has detected the exception associated with the debug.

Also, in a second invention of a data processor of the present invention, when the exception occurs at the time point where there are plural unprocessed data in the store buffer, with respect to respective unprocessed data in the store buffer, data to be stored, the storing destination address and the address of the instruction requesting the storing processing are saved in the stack, so that in the exception processing handler, the instruction addresses related to respective data whose storing processing is not completed can be obtained, thus the cause of exception can be easily analyzed.

In a third invention of a data processor of the present invention, when the exception occurs at the time point where there are plural unprocessed data in the store buffer, with respect to respective unprocessed data in the store buffer, data to be store, the storing destination address and information necessary for performing the storing processing are saved in the stack, so that the unprocessed data can be easily write retried in the exception processing handler.

In a fourth invention of a data processor of the present invention, when the exception occurs at the time point where there are plural unprocessed data in the store buffer, with respect to respective unprocessed data saved in the stack, the instruction which write retries the respective unprocessed data in response to data to be stored, the storing destination address and information necessary for performing the storing processing is included, so that by executing the instruction by the exception processing handler, the unprocessed data can be easily written and retried.

In a fifth invention of a data processor of the present invention, when the exception occurs at the time point where there are plural unprocessed data in the store buffer, with respect to respective data in the store buffer, by repeating recursively the operation to save a series of data including data to be stored, the storing destination address, information necessary for performing the storing processing, and further, information indicating whether a set of data related to the unprocessed data is present, in the stack in a set, the unprocessed data are all saved in the stack. Then, a series of data set including data to be stored, the storing destination address, information necessary for performing the storing processing, and further, information indicating whether a set of data related to the unprocessed data is present, is fetched by the exception processing handler. Moreover, by repeating recursively the operation to check the information indicating whether a set of unprocessed data is present, the unprocessed data saved in the stack are all fetched and the exception processing is performed. And hence, unprocessed data can be exchanged in a uniform format, independently of the number of unprocessed data, between the starting processing of the exception processing handler and the exception processing by the processing handler when the exception occurs. Accordingly, a data processor having the store buffer of different of capacity and softwares compatible with the data processor of the present invention can be readily realized. Besides, since the starting processing of the exception processing handler and the exception processing in the exception processing handler can be executed recursively with respect to respective plural unprocessed data, the quantity of hardwares necessary for these processings is constant independent of the number of unprocessed data, and even when the number of unprocessed data is increased, a few hardwares are necessary for the processing.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A pipelined data processing system comprising:
   a control unit for controlling execution of a plurality of data processor instructions and for detecting an exception during execution of one of said instructions;
   an instruction execution unit, coupled to said control unit, for executing said instructions;
   an input/output unit for outputting to and receiving from an external memory, a plurality of data and said instructions;
   a store buffer coupled to said input/output unit for storing an operand, an operand address, an instruction address of said operand and store operation information to indicate an operand size;
   an exception processing handler starter, coupled to said control unit, for saving in a stack, before said store buffer completes storage in said external memory, and when said control unit detects an exception:
   (i) a first exception control data including a first unprocessed data, information for completing processing of said first unprocessed data, and a flag indicating an absence of unprocessed data stored in said stack ahead of said first unprocessed data;
   (ii) a second exception control data including a second unprocessed data, information for completing processing of said second unprocessed data and a second flag indicating that said first unprocessed data is stored in said stack ahead of said second unprocessed data; and
   an exception processing handler for fetching said first and said second exception control data from said stack, and for processing said first and second unprocessed data.

2. A pipelined data processing system comprising:
   a control unit for controlling execution of a plurality of data processor instructions and for detecting an exception during execution of one of said instructions;
   an instruction execution unit, coupled to said control unit, for executing said instructions;
   an input/output unit for outputting to and receiving from an external memory, a plurality of data and said instructions;
   a store buffer coupled to said input/output unit for storing an operand, an operand address, an instruction address of a store operation and store operation information to indicate an operand size;
   an exception processing handler starter, coupled to said control unit, for saving in a stack, before said store buffer completes storage in said external memory, and when said control unit detects an exception:
   (i) a first exception control data including a first unprocessed data, information for completing processing of said first unprocessed data, and a flag indicating an absence of unprocessed data stored in said stack ahead of said first unprocessed data;
   (ii) a second exception control data including a second unprocessed data, information for completing processing of said second unprocessed data and a second flag indicating that said first unprocessed data is stored in said stack ahead of said second unprocessed data; and
   an exception processing handler for fetching said first and said second exception control data from said stack, and for processing said first and second unprocessed data.

3. The pipelined data processing system of claim 2 wherein said exception is detected during execution of a plurality of data processor instructions and for detecting an exception during execution of one of said instructions including a first instruction and a second instruction; wherein said first instruction occurs earlier in a program sequence listing than said second instruction; and wherein said stack stores, when said exception is detected before said store buffer completes storage of a first and a second operand in said external memory:
   (i) said first operand of said first instruction;
   (ii) a first external memory address of said first operand;
   (iii) a second external memory address of said first instruction;
   (iv) said second operand of said second instruction;
   (v) a third external memory address of said second operand; and
   (vi) a fourth external memory address of said second instruction.

4. The pipelined data processing system of claim 2 wherein said exception is detected during execution of a plurality of data processor instructions and for detecting an exception during execution of one of said instructions including a first instruction and a second instruction; wherein said first instruction occurs earlier in a program sequence listing than said second instruction; and wherein said stack stores, when said exception is detected before said store buffer completes storage of a first and a second operand in said external memory:
   (i) said first operand of said first instruction;
   (ii) a first external memory address of said first operand;
   (iii) a second external memory address of said first instruction;
   (iv) said second operand of a second instruction;
   (v) a third external memory address of said second operand;

(vi) a fourth external memory address of said second instruction; and (vii) information useful for executing storage of said first and said second operands in said external memory.

5. The pipelined data processing system of claim 2 wherein said exception is detected during execution of a plurality of data processor instructions and for detecting an exception during execution of one of said instructions including a first instruction and a second instruction; wherein said first instruction occurs earlier in a program sequence listing than said second instruction; and wherein said stack stores, when said exception is detected before said store buffer completes storage of a first and a second operand in said external memory:

(i) said first operand of a first instruction;
(ii) a first external memory address of said first operand;
(iii) a second external memory address of said first instruction;
(iv) said second operand of a second instruction;
(v) a third external memory address of said second operand;
(vi) a fourth external memory address of said second instruction; and
(vii) information useful for completing storage of said first and said second operands in said external memory.

6. A pipelined data processing system comprising:
a control unit for controlling execution of a plurality of data processor instructions and for detecting an exception during execution of one of said instructions;
a store buffer coupled to said control unit for storing an operand, an operand address, an instruction address of said operand and store operation information to indicate an operand size;
an exception processing handler starter, coupled to said control unit, for saving in a stack, before said store buffer completes storage, and when said control unit detects an exception:
(i) a first exception control data including a first unprocessed data, information for completing processing of said first unprocessed data, and a flag indicating an absence of unprocessed data stored in said stack ahead of said first unprocessed data;
(ii) a second exception control data including a second unprocessed data, information for completing processing of said second unprocessed data and a second flag indicating that said first unprocessed data is stored in said stack ahead of said second unprocessed data; and
an exception processing handler for fetching said first and said second exception control data from said stack.

7. A pipelined data processing system comprising:
a control unit for controlling execution of a plurality of data processor instructions and for detecting an exception during execution of one of said instructions;
a store buffer coupled to said control unit for storing an operand, an operand address, an instruction address of a store operation and store operation information to indicate an operand size;
an exception processing handler starter, coupled to said control unit, for saving in a stack, before said store buffer completes storage, and when said control unit detects an exception:
(i) a first exception control data including a first unprocessed data, information for completing processing of said first unprocessed data, and a flag indicating an absence of unprocessed data stored in said stack ahead of said first unprocessed data;
(ii) a second exception control data including a. second unprocessed data, information for completing processing of said second unprocessed data and a second flag indicating that said first unprocessed data is stored in said stack ahead of said second unprocessed data; and
an exception processing handler for fetching said first and said second exception control data from said stack and for processing said first and second unprocessed data.

8. The pipelined data processing system of claim 7 wherein said exception is detected during execution of a plurality of data processor instructions and for detecting an exception during execution of one of said instructions including a first instruction and a second instruction; wherein said first instruction occurs earlier in a program sequence listing than said second instruction; and wherein said stack stores, when said exception is detected before said store buffer completes storage of a first and a second operand:

(i) said first operand of said first instruction;
(ii) a first external memory address of said first operand;
(iii) a second external memory address of said first instruction;
(iv) said second operand of said second instruction;
(v) a third external memory address of said second operand; and
(vi) a fourth external memory address of said second instruction.

9. The pipelined data processing system of claim 7 wherein said exception is detected during execution of a plurality of data processor instructions and for detecting an exception during execution of one of said instructions including a first instruction and a second instruction; wherein said first instruction occurs earlier in a program sequence listing than said second instruction; and wherein said stack stores, when said exception is detected before said store buffer completes storage of a first and a second operand:

(i) said first operand of said first instruction;
(ii) a first external memory address of said first operand;
(iii) a second external memory address of said first instruction;
(iv) said second operand of a second instruction;
(v) a third external memory address of said second operand;
(vi) a fourth external memory address of said second instruction; and
(vii) information useful for executing storage of said first and said second operands.

10. The pipelined data processing system of claim 7 wherein said exception is detected during execution of a plurality of data processor instructions and for detecting an exception during execution of one of said instructions including a first instruction and a second instruction; wherein said first instruction occurs earlier in a program sequence listing than said second instruction; and wherein said stack stores, when said exception is detected before said store buffer completes storage of a first and a second operand:
- (i) said first operand of a first instruction;
- (ii) a first external memory address of said first operand;
- (iii) a second external memory address of said first instruction;
- (iv) said second operand of a second instruction;
- (v) a third external memory address of said second operand;
- (vi) a fourth external memory address of said second instruction; and
- (vii) information useful for completing storage of said first and said second operands.

11. A pipelined data processing system comprising:
- a control unit for controlling execution of a plurality of data processor instructions and for detecting an exception during execution of one of said instructions;
- an instruction execution unit, coupled to said control unit, for executing said instructions;
- an input/output unit for outputting to and receiving from an external memory, a plurality of data and said instructions;
- a store buffer coupled to said input/output unit for storing an operand, an operand address, an instruction address of said operand and store operation information to indicate an operand size;
- an exception processing handler starter, coupled to said control unit, for saving in a stack, before said store buffer completes storage in said external memory, and when said control unit detects an exception:
  - (i) a first exception control data including a first unprocessed data, information for completing processing of said first unprocessed data, and a first external memory address of a first instruction;
  - (ii) a second exception control data including a second external memory address of a second instruction; and
- an exception processing handler for fetching said first and said second exception control data from said stack, and for processing said first and second unprocessed data.

12. A pipelined data processing system comprising:
- a control unit for controlling execution of a plurality of data processor instructions and for detecting an exception during execution of one of said instructions;
- an instruction execution unit, coupled to said control unit, for executing said instructions;
- an input/output unit for outputting to and receiving from an external memory, a plurality of data and said instructions;
- a store buffer coupled to said input/output unit for storing an operand, an operand address, an instruction address of a store operation and store operation information to indicate an operand size;
- an exception processing handler starter, coupled to said control unit, for saving in a stack, before said store buffer completes storage in said external memory, and when said control unit detects an exception:
  - (i) a first exception control data including a first unprocessed data, information for completing processing of said first unprocessed data, and a first external memory address of a first instruction;
  - (ii) a second exception control data including a second external memory address of a second instruction; and
- an exception processing handler for fetching said first and said second exception control data from said stack, and for processing said first and second unprocessed data.

13. The pipelined data processing system of claim 12 wherein said exception is detected during execution of one of said instructions including said first instruction and said second instruction; wherein said first instruction occurs earlier in a program sequence listing than said second instruction; and wherein said stack stores, when said exception is detected during execution of said second instruction and before execution of said first instruction is complete:
- (i) a first operand of said first instruction;
- (ii) a third external memory address of said first operand;
- (iii) said first external memory address; and
- (iv) said second external memory address.

14. A pipelined data processing system comprising:
- a control unit for controlling execution of a plurality of data processor instructions and for detecting an exception during execution of one of said instructions;
- a store buffer coupled to said control unit for storing an operand, an operand address, an instruction address of said operand and store operation information to indicate an operand size;
- an exception processing handler starter, coupled to said control unit, for saving in a stack, before said store buffer completes storage, and when said control unit detects an exception:
  - (i) a first exception control data including a first unprocessed data, information for completing processing of said first unprocessed data, and a first external memory address of a first instruction;
  - (ii) a second exception control data including a second external memory address of a second instruction; and
- an exception processing handler for fetching said first and said second exception control data from said stack.

15. A pipelined data processing system comprising:
- a control unit for controlling execution of a plurality of data processor instructions and for detecting an exception during execution of one of said instructions;
- a store buffer coupled to said control unit for storing an operand, an operand address, an instruction address of a store operation and store operation information to indicate an operand size;
- an exception processing handler starter, coupled to said control unit, for saving in a stack, before said store buffer completes storage, and when said control unit detects an exception:
  - (i) a first exception control data including a first unprocessed data, information for completing processing of said first unprocessed data, and a first external memory address of a first instruction;
  - (ii) a second exception control data including a second external memory address of a second instruction; and an exception processing handler for fetching said first and said second exception control data from said stack and for processing said first and second unprocessed data.

16. The pipelined data processing system of claim 15 wherein said exception is detected during execution of one of said instructions including said first instruction and said second instruction; wherein said first instruction occurs earlier in a program sequence listing than said second instruction; and wherein said stack stores, when said exception is detected during execution of said second instruction and before execution of said first instruction is complete:

(i) a first operand of said first instruction;
(ii) a third external memory address of said first operand;
(iii) said first external memory address; and
(iv) said second external memory address.

* * * * *